United States Patent
Fouda et al.

(10) Patent No.: US 12,410,701 B2
(45) Date of Patent: Sep. 9, 2025

(54) SEQUENTIAL SELECTION OF LOCATIONS FOR FORMATION PRESSURE TEST FOR PRESSURE GRADIENT ANALYSIS

(71) Applicant: Halliburton Energy Services, Inc., Houston, TX (US)

(72) Inventors: Ahmed Fouda, Houston, TX (US); Bin Dai, Houston, TX (US); Christopher Michael Jones, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 366 days.

(21) Appl. No.: 18/075,256

(22) Filed: Dec. 5, 2022

(65) Prior Publication Data
US 2024/0183267 A1 Jun. 6, 2024

(51) Int. Cl.
*E21B 47/06* (2012.01)
*E21B 49/08* (2006.01)
*G01V 11/00* (2006.01)
*G06N 20/00* (2019.01)

(52) U.S. Cl.
CPC ............ *E21B 47/06* (2013.01); *E21B 49/08* (2013.01); *G01V 11/00* (2013.01); *E21B 2200/22* (2020.05); *G06N 20/00* (2019.01)

(58) Field of Classification Search
CPC ...... E21B 47/06; E21B 2200/22; E21B 49/08; E21B 43/00; E21B 47/10; G01V 9/00; G01V 11/00; G06F 17/50; G06N 20/00
See application file for complete search history.

(56) References Cited

U.S. PATENT DOCUMENTS

| | | |
|---|---|---|
| 6,826,486 B1 | 11/2004 | Malinverno |
| 9,720,130 B2 | 8/2017 | Djikpesse et al. |
| 10,329,908 B2 | 6/2019 | Fox et al. |
| 10,436,028 B2 * | 10/2019 | Dai ..................... G01N 21/359 |
| 10,775,359 B2 | 9/2020 | Jones et al. |
| 10,921,476 B2 | 2/2021 | Xia et al. |
| 10,927,672 B2 | 2/2021 | Dai et al. |
| 11,092,006 B2 * | 8/2021 | Jones ..................... E21B 49/10 |
| 11,365,627 B2 | 6/2022 | Dai et al. |
| 11,459,881 B2 | 10/2022 | Li et al. |
| 2004/0168797 A1 | 9/2004 | Barrow |
| 2005/0242807 A1 | 11/2005 | Freedman |

(Continued)

OTHER PUBLICATIONS

International Search Report and Written Opinion for International Patent Application No. PCT/US2023/010324 dated Aug. 25, 2023.

*Primary Examiner* — Lisa M Caputo
*Assistant Examiner* — Toni D Sauncy
(74) *Attorney, Agent, or Firm* — Benjamin Ford; C. Tumey Law Group, PLLC

(57) ABSTRACT

A method may comprise disposing a downhole pressure sampling tool into a wellbore; calculating a prior distribution based at least in part on one or more proxy logs, moving the downhole pressure sampling tool to a first location in the wellbore, taking at least one measurement with the downhole pressure sampling tool at the first location in the wellbore, calculating a posterior distribution based at least in part on the at least one measurement and the prior distribution, identifying a second location based at least in part on the posterior distribution, and moving the downhole pressure sampling tool to the second location.

20 Claims, 16 Drawing Sheets

(56) References Cited

U.S. PATENT DOCUMENTS

| | | |
|---|---|---|
| 2006/0282219 A1 | 12/2006 | Proett et al. |
| 2014/0278110 A1* | 9/2014 | Chugunov ............. G01V 11/00 |
| | | 702/6 |
| 2015/0066459 A1 | 3/2015 | Flemings et al. |
| 2015/0277438 A1 | 10/2015 | Chen et al. |
| 2015/0317344 A1* | 11/2015 | Birdwell ........... G06F 16/24578 |
| | | 707/797 |
| 2018/0259672 A1 | 9/2018 | Samson et al. |
| 2020/0149387 A1 | 5/2020 | Stark et al. |
| 2020/0284140 A1* | 9/2020 | Jones ..................... E21B 47/06 |
| 2020/0400858 A1 | 12/2020 | Olapade et al. |
| 2021/0007654 A1* | 1/2021 | Lu ............................ A61B 5/16 |
| 2021/0131283 A1 | 5/2021 | Jones et al. |
| 2021/0131951 A1 | 5/2021 | Dai et al. |
| 2021/0215033 A1 | 7/2021 | Jones et al. |
| 2021/0332699 A1 | 10/2021 | Dai et al. |
| 2022/0074303 A1* | 3/2022 | Molla .................... G06N 20/00 |
| 2022/0252759 A1 | 8/2022 | Chen et al. |
| 2022/0282612 A1 | 9/2022 | Jones et al. |

* cited by examiner

SEQUENTIAL SELECTION OF LOCATIONS FOR FORMATION PRESSURE TEST FOR PRESSURE GRADIENT ANALYSIS

BACKGROUND

During oil and gas exploration, many types of information may be collected and analyzed. The information may be used to determine the quantity and quality of hydrocarbons in a reservoir and to develop or modify strategies for hydrocarbon production. For instance, the information may be used for reservoir evaluation, flow assurance, reservoir stimulation, facility enhancement, production enhancement strategies, and reserve estimation. One technique for collecting relevant information involves pressure testing a formation of interest at one or more depths. Pressure test operations may be utilized to determine pressure gradients which may be further interpreted to model and/or assess reservoir features such as reservoir compartmentalization, fluid contact depths (e.g.: gas-oil-water contacts), compositional grading.

Pressure testing operations may be one of the last openhole logging operations conducted prior to completing a well. As such, previously acquired logs and operational reports obtained during the drilling process may be utilized to inform decisions regarding where to focus efforts related to downhole pressure sampling operations. Pressure testing operations may be time-consuming and obtaining data of adequate quality is not assured. Additionally, if the quality of the formation pressure tests is retrospectively identified to be inadequate, there may not be recourse for remedial action. For example, over-sampling a formation may ensure that an adequate amount of sample points have been collected, but it may be more time intensive than what was necessarily required. However, under-sampling a formation may result in an insufficient amount of data further resulting in an ambiguous or unusable dataset. It would be beneficial to have a method that could reduce the amount of time required to gather formation pressure test data while ensuring that the data is of adequate quality.

BRIEF DESCRIPTION OF THE DRAWINGS

These drawings illustrate certain aspects of some examples of the present disclosure and should not be used to limit or define the disclosure.

DETAILED DESCRIPTION

Figure 1:
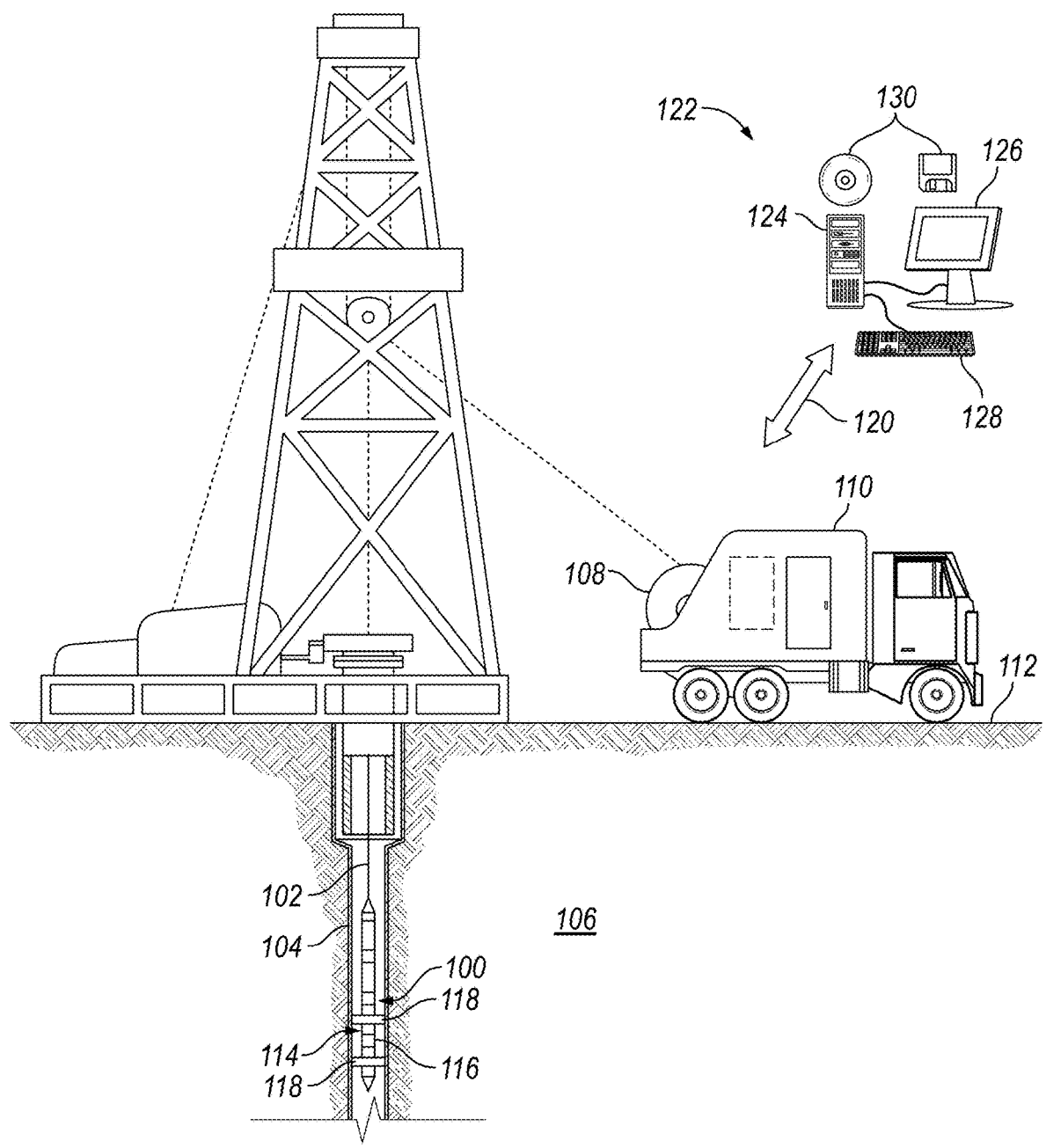
FIG. 1 illustrates an example downhole pressure sampling tool disposed on a wireline.

This disclosure may generally relate to obtaining formation pressure measurements or sample measurements in subterranean formations, and more particularly, to methods and systems which utilize a Bayesian Framework to identify prospective formation pressure testing or sampling locations which maximize or improve information gain. In some examples, utilizing a Bayesian Framework may increase of maximize the rate of information gain per formation pressure testing or sampling location. Bayes' Theorem may be a statistical method which calculates the probability that an event may occur given the probability of other specific events that may occur may be known or may be estimated. A Bayesian Framework may be a recursive workflow where a prior distribution may be updated according to Bayes' Theorem to create a posterior distribution when new data is acquired. For example, an initial approximation of formation pressure at one or more depths may be estimated from previously acquired log data before any one or more formation pressure measurements are acquired. Once a formation pressure measurement is acquired, however, the initial approximation (i.e., prior distribution), may be updated according to the acquired formation pressure measurement in conjunction with a likelihood function to create a posterior distribution. Other methods to calculate the posterior distribution may be utilized, including but not limited to principal component analysis, partial least squares, Monte Carlo methods, and simulation methods. As an example, the covariance matrix method will be described below: The prior distribution may capture the correlation among different depth points through a covariance matrix. After each pressure measurement is acquired, the posterior distribution is computed, and the covariance matrix of the posterior distribution is updated. The remaining candidate formation pressure sample locations are determined based on the updated covariance matrix such that the expected information gain from the potential measurement locations is maximized. In some examples, the formation pressure at any given depth in a subterranean formation may be a function of the fluid pressure and/or the overburden pressure at the given depth in the subterranean formation. In some examples, overburden pressure may further be a function of the weight of the geologic strata which overlays any given depth within a subterranean formation. In further examples, overburden pressure may be referred to as lithostatic pressure. In some examples, formation pressure may be referred to as the formation fluid pressure. In some examples, a reservoir compartment may be sealed on the top and bottom by a sufficiently impermeable barrier. In such examples, the change in formation pressure as a function of depth is due to the weight of the fluid column above the location within the compartment. The formation pressure may also be affected by rock characteristics such as but not limited to capillary pressure and/or rock wettability. As such, the formation pressure may be a combination of fluid and rock effects. In some examples, the terms formation pressure and/or formation fluid pressure may not imply pressures caused by isolated effects.

Previously acquired data which is used to estimate an initial formation pressure distribution may be referred to as "proxy data." In some examples, proxy data may include one or more logs which may further create a dataset. As will be detailed further below, a dataset of proxy data may aide in creating an initial estimate of the formation pressure and/or formation fluid properties at various depths in a subterranean formation. Formation fluid properties may include physical or chemical properties such as but not limited to composition, gas to oil ratio ("GOR"), gas concentrations, saturates, aromatics, resin concentrations, asphaltene concentrations. C6+ concentrations, density, viscosity, potential of hydrogen (e.g., "pH"), oxidation potential (e.g., "eH"), water to hydrocarbon ratio, salinity, ion chemistry, sodium, magnesium, potassium, calcium, magnesium, chloride, bromide, sulfide, sulfate, carbonate, bicarbonate, iodide, hydrogen sulfide and carbon dioxide. In some examples, pressure may be one property of the formation and/or formation fluid, however the embodiments described herein may apply to other formation fluid properties including chemical and/or physical fluid properties. As described herein, a fluid may be a liquid, solid, or emulsion. In some examples, an emulsion may include a slurry of solids incorporated into a liquid matrix such that the emulsion behaves as a liquid. Additionally, data obtained during wellbore construction operations, such as previously acquired well logs, may be used to identify and rank potential areas (i.e., depths) of interest for formation pressure testing. In some non-limiting examples, the logs and data may contain measurements or interpretations related to lithology, geochemistry, geological structure and/or compartmentalization, geological depositional environment, reservoir fluid properties and/or saturations, or petrophysical properties. In further examples, the datasets may be built from openhole logs including but not limited to gamma ray, density porosity, neutron porosity, resistivity, nuclear magnetic resonance ("NMR"), sonic and ultrasonic, borehole images, optical measurements, mud logs, or a combination thereof. The openhole logs may additionally include logs with nuclear sensors, logs with acoustic sensors, logs with electromagnetic sensors, and/or combinations thereof. In some examples, the raw data acquired from open hole logs may be interpretated to be translated into a reservoir property. The log datasets used in the proxy data may utilize either the raw log data, the interpretated log data, or a combination thereof. Additionally, parameters used during the drilling process such as mud weight and/or estimated pore pressure, may also provide insight for the initial estimated formation pressure distribution.

As mentioned in the foregoing, a calculated feature known as the information gain may be utilized to rank the order in which candidate formation pressure sample locations should be considered for formation pressure testing. In some examples, information gain may be inversely correlated with entropy which may further represent a measure of disorder or uncertainty. In some examples, information gain may provide for a measure of the knowledge about a system. In some examples, the system may include a subterranean fluid system within a subterranean formation. Obtaining measurements may provide a context to discover knowledge of the system, however measurements of the same kind may not provide an equivalent amount of additional information if they are obtained, for example, at different locations or depths. In some examples, a difference in the way that the measurements are taken may result in differing amounts of information gain. In some examples, it may be beneficial to increase the rate of information gain with respect to measurement location. The term maximize may reflect an increase of information gained from one potential data sampling location with respect to one or more alternative potential data sampling locations. For example, the sampling point associated with the highest variance will yield the largest reduction in uncertainty once the measurement has been acquired. In some examples, selecting a sampling point with the highest variance is intended to mean exactly that. However, in some examples, selecting a sampling point with the highest variance may not exclusively mean selecting the sampling location associated with the absolute highest variance. For example, in some examples, selecting a sampling point with the highest variance may include ranking the potential sampling points from highest variance to lowest variance and selecting a sampling point from the potential sampling points which rank in the top 20% by variance. In further examples the sampling point may be selected from the potential sampling points which rank in the top 15% by variance, the top 10% by variance, the top 5% by variance, the top 3% by variance, the top 2% by variance, or the top 1% by variance. In further examples, when entropy is reduced and the associated uncertainty is reduced, information gain may increase. As such, information gain may be utilized as a metric to quantify and/or assess the incremental value of acquiring certain additional datapoints. Furthermore, information gain, or alternatively, the rate of information gain with respect to the count of measurement locations, may be utilized to assess whether the formation pressure data points that have been acquired are of adequate quantity and quality while a downhole pressure sampling tool is in a wellbore. In some examples it may be beneficial to determine if an adequate quantity of sampling measurements have been acquired to sufficiently describe a particular system in view of how knowledge about the system will be utilized. This understanding of the system, as determined by the collection of sampling measurements, may further be considered in view of how well knowledge about the system may be gathered. For example, fluids contained in subterranean formations may have varying gradients according to the fluids present at various depths. In some examples, there may be one or more fluid contacts located at one or more depths or depth ranges where the predominate fluid type transitions from a first fluid type having a first average density to a second fluid type having a second average density. In some examples, this transition may be referred to as a contact point, fluid contact, or fluid contact point. In further examples, the contact point, or intersection of the two pressure gradients associated with the two fluids, may be identified from a given number of sampling measurements where the sampling measurements may have an associated amount of uncertainty. However, at some point in the process of sampling measurements, obtaining additional measurements may not improve the system knowledge with respect to identifying the depth or depth range of the contact point. In some examples, this may be referred to as the law of diminishing returns. In further examples, as described herein, it may be beneficial to identify and/or quantify the level of diminishing returns to determine if acquiring additional measurements would be beneficial in view of measurements which may have been acquired. As such, determining and assessing the information gain may provide for quality control and assessment of the measured formation pressure data while ensuring that adequate formation pressure sampling is performed. In this application a method and a system are proposed for sorting and/or ranking candidate formation pressure measurement locations according to the expected information gain from each potential measurement location. In some examples, the level of uncertainty may be used to establish a termination threshold. In other examples, the differential information gain may be used to establish a termination threshold.

FIG. 1 is a schematic diagram of downhole pressure sampling tool 100 on a conveyance 102 in accordance with example embodiment. In some examples, downhole pressure sampling tool 100 may additionally include a fluid sampling tool capable of obtaining various fluid property measurements. As illustrated, wellbore 104 may extend through subterranean formation 106. In examples, reservoir fluid may be contaminated with well fluid (e.g., drilling fluid) from wellbore 104. As described herein, the formation pressure samples may be obtained at various depths within subterranean formation 106. The formation pressure samples may further be used to identify formation pressure gradients within subterranean formation 106. Depth-pressure measurements may be indicative of the type of reservoir fluids present in subterranean formation 106. For example, a reservoir fluid may manifest as a formation pressure gradient and a formation pressure gradient may be determined from depth-pressure measurements. A formation pressure gradient may be directed to a first order linear equation. However, the formation pressure gradient may be additionally affected by compositional changes, capillary pressures, and relative permeabilities which may yield a pressure gradient curve. In some examples, compositional grading within the subterranean formation may result in second order density changes. Other fluid measurements may be affected by other physical properties leading to other gradient forms such as diffusion, chemical solubility, and/or chemical potential effects. Such other gradient forms may be derived through physical relationships including but not limited to thermodynamic, kinetic, gravimetric, and/or chemical relationships.

As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 1 shows a vertical or low inclination angle well, high inclination angle or horizontal placement of the well and equipment is also possible. It should further be noted that while FIG. 1 generally depicts a land-based operation, those skilled in the art will readily recognize that the principles described herein are equally applicable to subsea operations that employ floating or sea-based platforms and rigs, without departing from the scope of the disclosure.

As illustrated, a hoist 108 may be used to move downhole pressure sampling tool 100 to specific depths in wellbore 104 to acquire a formation pressure test. In some examples, downhole pressure sampling tool 100 may be referred to as a formation testing tool, formation tester, or downhole sampling tool. Hoist 108 may be disposed on a vehicle 110. Hoist 108 may be used, for example, to raise and lower conveyance 102 in wellbore 104. While hoist 108 is shown on vehicle 110, it should be understood that conveyance 102 may alternatively be disposed from a hoist 108 that is installed at surface 112 instead of being located on vehicle 110. Downhole pressure sampling tool 100 may be suspended in wellbore 104 on conveyance 102. Other conveyance types may be used for conveying downhole pressure sampling tool 100 into wellbore 104, including coiled tubing and wired drill pipe, for example. Downhole pressure sampling tool 100 may have a tool body 114, which may be elongated as shown on FIG. 1. Tool body 114 may be any suitable material, including without limitation titanium, stainless steel, alloys, plastic, combinations thereof, and the like. Downhole pressure sampling tool 100 may further have one or more probes and/or sensors 116 for measuring formation pressure samples at various depths of subterranean formation 106. Isolation packers 118 may further be disposed above and below probes and/or sensors 116. When isolation packers 118 are engaged against wellbore 104, probes and/or sensors 116 may be isolated from the wellbore fluid. Probes and/or sensors 116 may further be pushed through the mudcake lining wellbore 104 to contact subterranean formation 106 and collect a formation pressure measurement. In some examples, pressure drawdown is induced by extracting a small amount of formation fluid from subterranean formation 106. After the fluid extraction process is ceased, the pressure may build back up to a stable pressure, at which point a formation pressure measurement may be taken. In some examples, sensors 116 may include a quartz gauge, a strain gauge, or a combination thereof.

Downhole pressure sampling tool 100 may also be operable to measure formation pressures in subterranean formation 106 and may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, downhole pressure sampling tool 100 may include random access memory (RAM), one or more processing units, such as a central processing unit (CPU), or hardware or software control logic, ROM, and/or other types of nonvolatile memory.

Any suitable technique may be used for transmitting signals from the downhole pressure sampling tool 100 to surface 112. As illustrated, a communication link 120 (which may be wired or wireless, for example) may be provided that may transmit data from downhole pressure sampling tool 100 to an information handling system 122 at surface 112. Information handling system 122 may include a processing unit 124, a monitor 126, an input device 128 (e.g., keyboard, mouse, etc.), and/or computer media 130) (e.g., optical disks, magnetic disks) that can store code representative of the methods described herein. Information handling system 122 may act as a data acquisition system and possibly a data processing system that analyzes information from downhole pressure sampling tool 100. For example, information handling system 122 may process the information from downhole pressure sampling tool 100 to calculate a posterior formation pressure distribution, identify information gain associated with the collection of additional formation pressure measurements, sort potential additional pressure locations according to information gain, and/or determine in a termination criterion has been met. Information handling system 122 may also compute a prior distribution of formation pressure gradients from the proxy logs, determine the next measurement location which maximizes information gain, post-process gradient log to identify fluid contact depths, and/or identify and delineate compartments. This processing may occur at surface 112 in real-time. Alternatively, the processing may occur downhole or at surface 112 or another location after recovery of downhole pressure sampling tool 100 from wellbore 104. In the event that the processing occurs on an information handling system 122 disposed on downhole pressure sampling tool 100, the resultant formation pressure measurements (i.e., reservoir pressure measurements or subterranean formation pressure measurements) may then be transmitted to surface 112, for example, in real-time.

Figure 2:
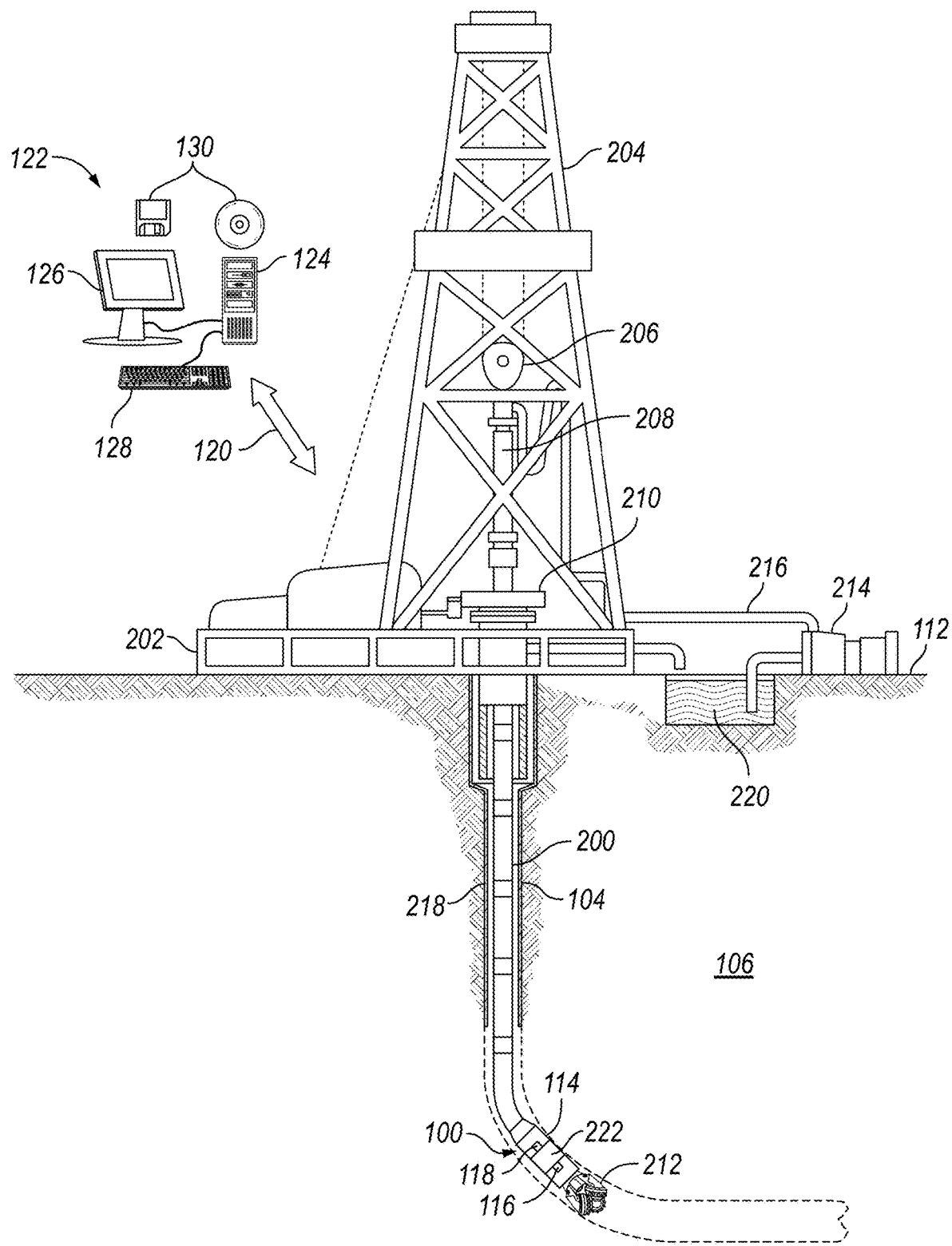
FIG. 2 illustrates an example downhole pressure sampling tool disposed on a drill string.

Referring now to FIG. 2, a schematic diagram is shown of downhole pressure sampling tool 100 disposed on a drill string 200 in a drilling operation in accordance with example embodiments. Downhole pressure sampling tool 100 may be used to obtain a formation pressure measurement, for example, a formation pressure measurement at a depth of interest in subterranean formation 106. As described herein, the formation pressure samples may be obtained at various depths within subterranean formation 106. The formation pressure samples may further be used to identify formation pressure gradients within subterranean formation 106. Depth-pressure measurements may be indicative of the type of reservoir fluids present in subterranean formation 106. For example, a reservoir fluid may manifest as a formation pressure gradient and a formation pressure gradient may be determined from depth-pressure measurements. A formation pressure gradient may be directed to a first order linear equation. However, the formation pressure gradient may be additionally affected by compositional changes, capillary pressure and relative permeability yielding a tangential curve, or equations of state yielding to a second order exponential behavior. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 2 shows a vertical or low inclination angle well, high inclination angle or horizontal placement of the well and equipment is also possible. It should further be noted that while FIG. 2 generally depicts a land-based operation, those skilled in the art will readily recognize that the principles described herein are equally applicable to subsea operations that employ floating or sea-based platforms and rigs, without departing from the scope of the disclosure.

As illustrated, a drilling platform 202 may support a derrick 204 having a traveling block 206 for raising and lowering drill string 200. Drill string 200 may include, but is not limited to, drill pipe and coiled tubing, as generally known to those skilled in the art. A kelly 208 may support drill string 200 as it may be lowered through a rotary table 210. A drill bit 212 may be attached to the distal end of drill string 200 and may be driven either by a downhole motor and/or via rotation of drill string 200 from the surface 112. Without limitation, drill bit 212 may include, roller cone bits, polycrystalline diamond ("PDC") bits, natural diamond bits, any hole openers, reamers, coring bits, and the like. As drill bit 212 rotates, it may create and extend wellbore 104 that penetrates various subterranean formations 106. A pump 214 may circulate drilling fluid through a feed pipe 216 to kelly 208, downhole through interior of drill string 200, through orifices in drill bit 212, back to surface 112 via annulus 218 surrounding drill string 200, and into a retention pit 220.

Drill bit 212 may be just one piece of a downhole assembly that may include one or more drill collars 222 and downhole pressure sampling tool 100. Downhole pressure sampling tool 100, which may be built into the drill collars 222, may gather formation pressure measurements from subterranean formation 106 as described herein. One or more of the drill collars 222 may form a tool body 114, which may be elongated as shown on FIG. 2. Tool body 114 may be any suitable material, including without limitation titanium, stainless steel, alloys, plastic, combinations thereof, and the like. Downhole pressure sampling tool 100 may be similar in configuration and operation to downhole pressure sampling tool 100 shown on FIG. 1 except that FIG. 2 shows downhole pressure sampling tool 100 disposed on drill string 200. Alternatively, downhole pressure sampling tool 100 may be lowered into the wellbore after drilling operations on a wireline. In examples, logging while drilling (LWD) may also be implemented.

As previously described, information from downhole pressure sampling tool 100 may be transmitted to an information handling system 122, which may be located at surface 112. As illustrated, communication link 120 (which may be wired or wireless, for example) may be provided that may transmit data from downhole pressure sampling tool 100 to an information handling system 111 at surface 112. Information handling system 140 may include a processing unit 124, a monitor 126, an input device 128 (e.g., keyboard, mouse, etc.), and/or computer media 130 (e.g., optical disks, magnetic disks) that may store code representative of the methods described herein. In addition to, or in place of processing at surface 112, processing may occur downhole. In examples, information handling system 122 may perform computations to estimate clean fluid composition. In the presence of drilling fluid filtrate contamination, the effects on fluid or rock properties measured may need to be deconvoluted by means such as but not limited to trend fitting or equation of state deconvolution.

Figure 3:
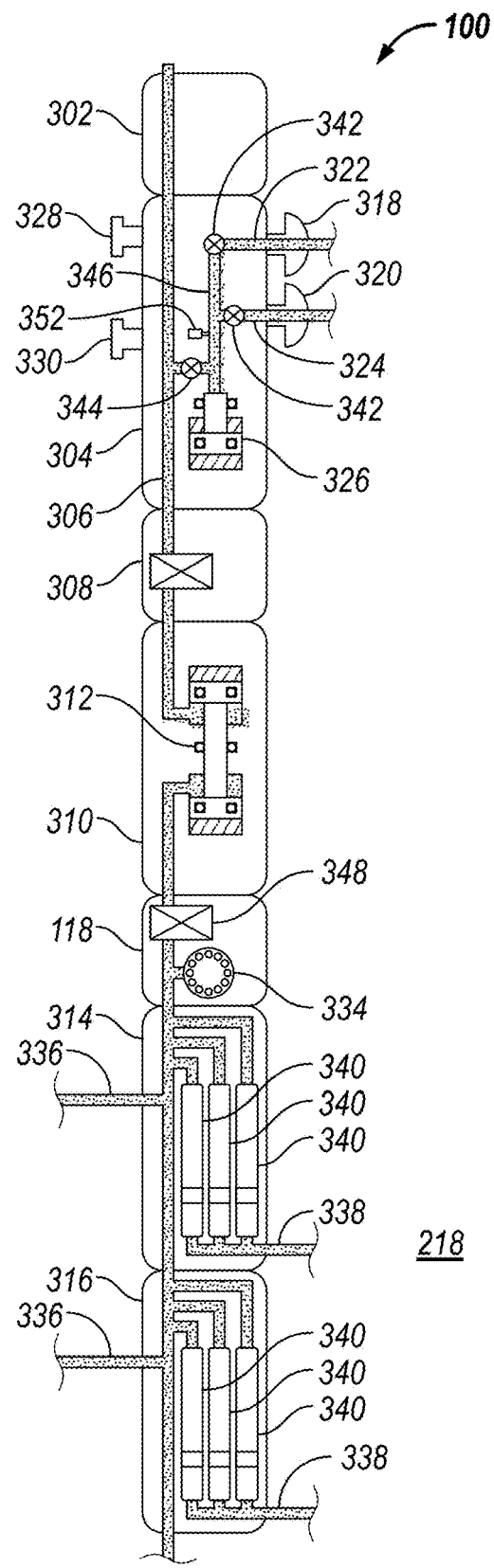
FIG. 3 illustrates a schematic of a fluid sampling tool.

FIG. 3 is a schematic of downhole pressure sampling tool 100. In some examples, downhole pressure sampling tool 100 may be referred to as a downhole sampling tool. In examples one embodiment, the downhole pressure sampling tool 100 includes a power telemetry section 302 through which the tool communicates with other actuators and sensors 116 in drill string 200 or conveyance 102 (e.g., referring to FIGS. 1 and 2), the drill string's telemetry section 302, and/or directly with a surface telemetry system (not illustrated). In examples, power telemetry section 302 may also be a port through which the various actuators (i.e., valves) and sensors (e.g., temperature and pressure sensors) in the downhole pressure sampling tool 100 may be controlled and monitored. In examples, power telemetry section 302 includes a computer that exercises the control and monitoring function. In one embodiment, the control and monitoring function is performed by a computer in another part of the drill string or wireline tool (not shown) or by information handling system 122 on surface 112 (e.g., referring to FIGS. 1 and 2).

In examples, downhole pressure sampling tool 100 includes a dual probe section 304, which extracts fluid from the reservoir and delivers it to a passageway 306 that extends from one end of downhole pressure sampling tool 100 to the other. Without limitation, dual probe section 304 includes two probes 318, 320 which may extend from downhole pressure sampling tool 100 and press against the inner wall of wellbore 104 (e.g., referring to FIG. 1). Probe channels 322, 324 may connect probes 318, 320 to passageway 306. The high-volume bidirectional pump 312 may be used to pump fluids from the reservoir, through probe channels 322, 324 and to passageway 306. Alternatively, a low volume pump 326 may be used for this purpose. Two standoffs or stabilizers 328, 330 hold downhole pressure sampling tool 100 in place as probes 318, 320 press against the wall of wellbore 104. In examples, probes 318, 320 and stabilizers 328, 330 may be retracted when downhole pressure sampling tool 100 may be in motion and probes 318, 320 and stabilizers 328, 330 may be extended to sample the formation fluids at any suitable location in wellbore 104. Other probe sections include focused sampling probes, oval probes, or packers.

In examples, passageway 306 may be connected to other tools disposed on drill string 200 or conveyance 102 (e.g., referring to FIGS. 1 and 2). In examples, downhole pressure sampling tool 100 may also include a quartz gauge section 308, which may include sensors to allow measurement of properties, such as temperature and formation pressure, of fluid in passageway 306. Additionally, downhole pressure sampling tool 100 may include a flow-control pump-out section 310, which may include a high-volume bidirectional pump 312 for pumping fluid through passageway 306. In examples, downhole pressure sampling tool 100 may include two multi-chamber sections 314, 316, referred to collectively as multi-chamber sections 314, 316 or individually as first multi-chamber section 314 and second multi-chamber section 316, respectively.

In examples, multi-chamber sections 314, 316 may be separated from flow-control pump-out section 310 by sensor section 332, which may house at least one non-optical fluid sensor 348 and/or at least optical measurement tool 334. It should be noted that non-optical fluid sensor 348 and optical measurement tool 334 may be disposed in any order on passageway 306. Additionally, although depicted in sensor section 332. Both non-optical fluid sensor 348 and optical measurement tool 334 may be disposed along passageway 306 at any suitable location within downhole pressure sampling tool 100. In some examples, downhole pressure sampling tool 100 may acquire measurements other than pressure and may therefore also be referred to as a downhole sampling tool.

Non-optical fluid sensor 348 may be displaced within sensor section 332 in-line with passageway 306 to be a "flow through" sensor. In alternate examples, non-optical fluid sensor 348 may be connected to passageway 306 via an offshoot of passageway 306. Without limitation, optical measurement tool 334 may include but not limited to the density sensor, capacitance sensor, resistivity sensor, and/or combinations thereof. In examples, non-optical fluid sensor 348 may operate and/or function to measure fluid properties of drilling fluid filtrate.

Optical measurement tool 334 may be displaced within sensor section 332 in-line with passageway 306 to be a "flow through" sensor. In alternate examples, optical measurement tool 334 may be connected to passageway 306 via an offshoot of passageway 306. Without limitation, optical measurement tool 334 may include optical sensors, acoustic sensors, electromagnetic sensors, conductivity sensors, resistivity sensors, a capacitance sensor, selective electrodes, density sensors, mass sensors, thermal sensors, chromatography sensors, viscosity sensors, bubble point sensors, fluid compressibility sensors, flow rate sensors, microfluidic sensors, selective electrodes such as ion selective electrodes, and/or combinations thereof. In examples, optical measurement tool 334 may operate and/or function to measure drilling fluid filtrate, discussed further below.

Additionally, multi-chamber section 314, 316 may comprise access channel 336 and chamber access channel 338. Without limitation, access channel 336 and chamber access channel 338 may operate and function to either allow a solids-containing fluid (e.g., mud) disposed in wellbore 104 in or provide a path for removing fluid from downhole pressure sampling tool 100 into wellbore 104. As illustrated, multi-chamber section 314, 316 may comprise a plurality of chambers 340. Chambers 340) may be sampling chamber that may be used to sample wellbore fluids, formation fluids, and/or the like during measurement operations. In some examples, downhole pressure sampling tool 100 may acquire measurements other than pressure and may therefore also be referred to as a downhole sampling tool.

During downhole measurement operations, a pumpout operation may be performed. A pumpout may be an operation where at least a portion of a fluid which may contain solids—(e.g., drilling fluid, mud, filtrate etc.) may move through downhole pressure sampling tool 100 until substantially increasing concentrations of formation fluids enter downhole pressure sampling tool 100. For example, during pumpout operations, probes 318, 320 may be pressed against the inner wall of wellbore 104 (e.g., referring to FIG. 1).

Pressure may increase at probes 318, 320 due to compression against subterranean formation 106 (e.g., referring to FIG. 1 or 2) exerting pressure on probes 318, 320. As pressure rises and reaches a predetermined pressure, valves 342 opens so as to close equalizer valve 344, thereby isolating fluid passageway 346 from the annulus 218. In this manner, valve 342 ensures that equalizer valve 344 closes only after probes 318, 320 has entered contact with mud cake (not illustrated) that is disposed against the inner wall of wellbore 104. In examples, as probes 318, 320 are pressed against the inner wall of wellbore 104, the pressure rises and closes the equalizer valve in fluid passageway 346, thereby isolating the fluid passageway 346 from the annulus 218. In this manner, the equalizer valve in fluid passageway 346 may close before probes 318, 320 may have entered contact with the mud cake that lines the inner wall of wellbore 104. Fluid passageway 346, now closed to annulus 218, is in fluid communication with low volume pump 326.

As low volume pump 326 is actuated, formation fluid may thus be drawn through probe channels 322, 324 and probes 318, 320. The movement of low volume pump 326 lowers the pressure in fluid passageway 346 to a pressure below the formation pressure, such that formation fluid is drawn through probe channels 322, 324 and probes 318, 320 and into fluid passageway 346. Probes 318, 320 serves as a seal to prevent annular fluids from entering fluid passageway 346. Such an operation as described may take place before, after, during or as part of a sampling operation.

With low volume pump 326 in its fully retracted position and formation fluid drawn into fluid passageway 346, the pressure will stabilize and enable pressure transducers 352 to sense and measure formation fluid pressure. The measured pressure is transmitted to information handling system 122 disposed on downhole pressure sampling tool 100 and/or it may be transmitted to the surface via mud pulse telemetry or by any other conventional telemetry means to an information handling system 122 disposed on surface 112.

During this interval, pressure transducers 352 may continuously monitor the pressure in fluid passageway 336 until the pressure stabilizes, or after a predetermined time interval. When the measured pressure stabilizes, or after a predetermined time interval, for example at 1800 psi, and is sensed by pressure transducer 352 the drawdown operation may be complete. Once complete, fluid for the pressure test in fluid passageway 336 may be dispelled from downhole pressure sampling tool 100 through the opening and/or closing of valves 342 and/or equalizer valve 344 as low volume pump 326 returns to a starting position.

Next, high-volume bidirectional pump 312 activates and equalizer valve 344 is opened. This allows for formation fluid to move toward high-volume bidirectional pump 312 through passageway 306. Formation fluid moves through passageway 306 to sensor section 332. Once the drilling fluid filtrate has moved into sensor section 332 high-volume bidirectional pump 312 may stop. This may allow the drilling fluid filtrate to be measured by optical measurement tool 334 within sensor section 332. Without limitation, any suitable properties of the formation fluid may be measured. In examples, properties may comprise formation pressure testing performed in a measurement operation.

Formation pressure is the force exerted by fluids contained in pore space of subterranean formation 106. Real-time measurement of this formation pressure data during drilling operations (i.e., seen in FIG. 2) may enable users to make decisions that may optimize the drilling operation and reduce uncertainties associated with the drilling operation.

Formation pressure test results obtained from a wireline operation (i.e., seen in FIG. 1) may allow measuring of formation fluid gradient and fluid mobility. The measurement may be performed using downhole pressure sampling tool 100 (e.g., referring to FIG. 1) that may be landed a particular depth in wellbore 104 to measure the formation pressure and mobility of that location. However, the quality of a formation pressure test may depend on the chosen location. Landing at a poor location may cause prolonged formation testing time and poor data quality.

Landing downhole pressure sampling tool 100 (as a wireline or LWD) at a desired depth with wellbore 104 may improve the quality of formation pressure test and reduce the pump out time to get clean fluid sample. Landing at a high-quality pressure test location also reduces the testing time as low-quality locations typically take twice as much time to complete with suboptimal testing result. To achieve landing at the high-quality pressure test locations, the correlation log from the formation tester is compared in real time with an open hole log to estimate the relative shifts between the correlation log and the open hole log. An open hole log is created during drilling operations. The relative shifts are applied on the correlation logs to identify the target depth and land downhole pressure sampling tool 100 at the high-quality pressure test location for a formation pressure test operation. To help ensure that downhole pressure sampling tool 100 lands on a high-quality pressure test location, a machine learning model may be utilized on one or more information handling systems 122.

Figure 4:
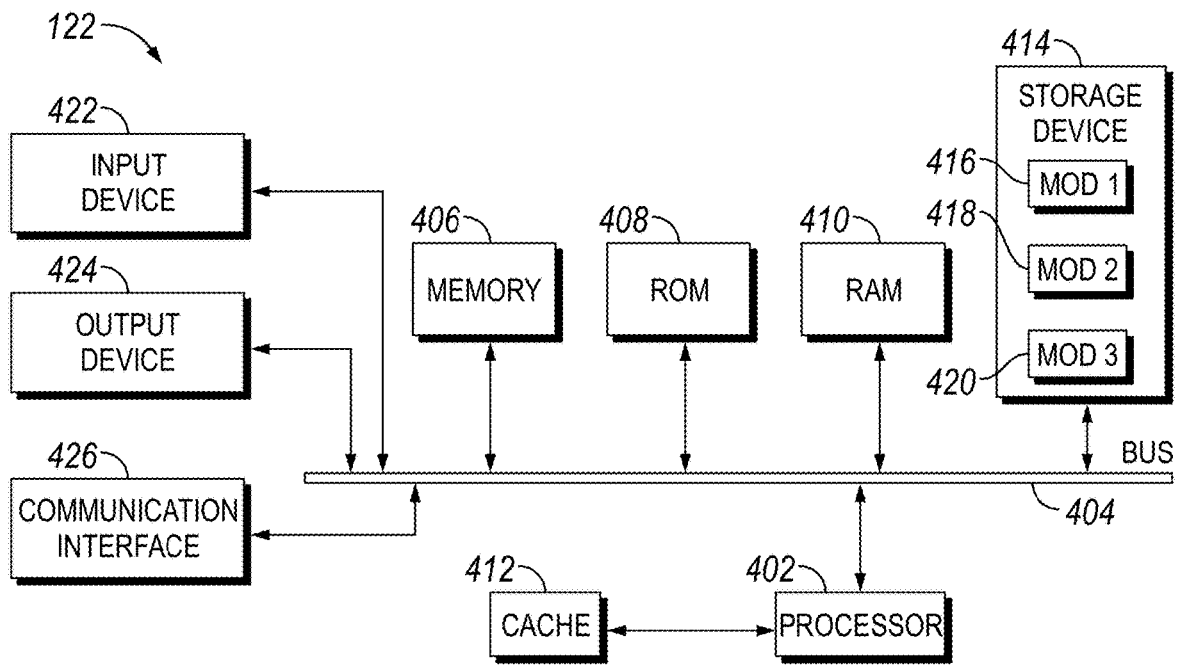
FIG. 4 illustrates an example of an information handling system.

FIG. 4 illustrates information handling system 122 which may be employed to perform various blocks, methods, and techniques disclosed herein. As illustrated, information handling system 122 includes a processing unit (CPU or processor) 402 and a system bus 404 that couples various system components including system memory 406 such as read only memory (ROM) 408 and random-access memory (RAM) 410 to processor 402. Processors disclosed herein may all be forms of this processor 402. Information handling system 122 may include a cache 412 of high-speed memory connected directly with, in close proximity to, or integrated as part of processor 402. Information handling system 122 copies data from memory 406 and/or storage device 414 to cache 412 for quick access by processor 402. In this way, cache 412 provides a performance boost that avoids processor 402 delays while waiting for data. These and other modules may control or be configured to control processor 402 to perform various operations or actions. Other system memory 406 may be available for use as well. Memory 406 may include multiple different types of memory with different performance characteristics. It may be appreciated that the disclosure may operate on information handling system 122 with more than one processor 402 or on a group or cluster of computing devices networked together to provide greater processing capability. Processor 402 may include any general-purpose processor and a hardware module or software module, such as first module 416, second module 418, and third module 420 stored in storage device 414, configured to control processor 402 as well as a special-purpose processor where software instructions are incorporated into processor 402. Processor 402 may be a self-contained computing system, containing multiple cores or processors, a bus, memory controller, cache, etc. A multi-core processor may be symmetric or asymmetric. Processor 402 may include multiple processors, such as a system having multiple, physically separate processors in different sockets, or a system having multiple processor cores on a single physical chip. Similarly, processor 402 may include multiple distributed processors located in multiple separate computing devices but working together such as via a communications network. Multiple processors or processor cores may share resources such as memory 406 or cache 412 or may operate using independent resources. Processor 402 may include one or more state machines, an application specific integrated circuit (ASIC), or a programmable gate array (PGA) including a field PGA (FPGA).

Each individual component discussed above may be coupled to system bus 404, which may connect each and every individual component to each other. System bus 404 may be any of several types of bus structures including a memory bus or memory controller, a peripheral bus, and a local bus using any of a variety of bus architectures. A basic input/output (BIOS) stored in ROM 408 or the like, may provide the basic routine that helps to transfer information between elements within information handling system 122, such as during start-up. Information handling system 122 further includes storage devices 414 or computer-readable storage media such as a hard disk drive, a magnetic disk drive, an optical disk drive, tape drive, solid-state drive. RAM drive, removable storage devices, a redundant array of inexpensive disks (RAID), hybrid storage device, or the like. Storage device 414 may include software modules 416, 418, and 420 for controlling processor 402. Information handling system 122 may include other hardware or software modules. Storage device 414 is connected to the system bus 404 by a drive interface. The drives and the associated computer-readable storage devices provide nonvolatile storage of computer-readable instructions, data structures, program modules and other data for information handling system 122. In one aspect, a hardware module that performs a particular function includes the software component stored in a tangible computer-readable storage device in connection with the necessary hardware components, such as processor 402, system bus 404, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 122 is a small, handheld computing device, a desktop computer, or a computer server. When processor 402 executes instructions to perform "operations", processor 402 may perform the operations directly and/or facilitate, direct, or cooperate with another device or component to perform the operations.

As illustrated, information handling system 122 employs storage device 414, which may be a hard disk or other types of computer-readable storage devices which may store data that are accessible by a computer, such as magnetic cassettes, flash memory cards, digital versatile disks (DVDs), cartridges, random access memories (RAMs) 410, read only memory (ROM) 408, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic ("EM") waves, and signals per se.

To enable user interaction with information handling system 122, an input device 422 represents any number of input mechanisms, such as a microphone for speech, a touch-sensitive screen for gesture or graphical input, keyboard, mouse, motion input, speech and so forth. Additionally, input device 422 may receive formation pressure measurements from downhole tool (e.g., downhole pressure sampling tool 100 in FIG. 1), discussed above. An output device 424 may also be one or more of a number of output mechanisms known to those of skill in the art. In some instances, multimodal systems enable a user to provide multiple types of input to communicate with information handling system 122. Communications interface 426 generally governs and manages the user input and system output. There is no restriction on operating on any particular hardware arrangement and therefore the basic hardware depicted may easily be substituted for improved hardware or firmware arrangements as they are developed.

With continued reference to FIG. 4, each individual component describe above is depicted and disclosed as individual functional blocks. The functions these blocks represent may be provided through the use of either shared or dedicated hardware, including, but not limited to, hardware capable of executing software and hardware, such as a processor 402, that is purpose-built to operate as an equivalent to software executing on a general-purpose processor. For example, the functions of one or more processors presented in FIG. 4 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 408 for storing software performing the operations described below, and random-access memory (RAM) 410 for storing results. Very large-scale integration (VLSI) hardware embodiments, as well as custom VLSI circuitry in combination with a general-purpose DSP circuit, may also be provided.

Figure 5:
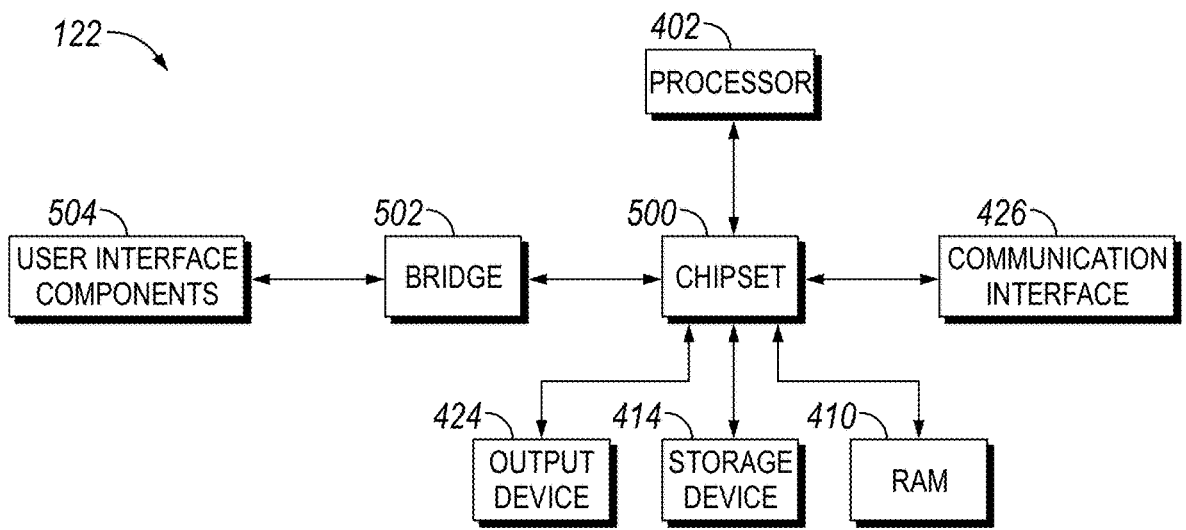
FIG. 5 illustrates a chipset architecture utilized in the information handling system.

FIG. 5 illustrates a chipset architecture utilized in the information handling system 122 that may be used in executing the described method and generating and displaying a graphical user interface (GUI). Information handling system 122 is an example of computer hardware, software, and firmware that may be used to implement the disclosed technology. Information handling system 122 may include a processor 402, representative of any number of physically and/or logically distinct resources capable of executing software, firmware, and hardware configured to perform identified computations. Processor 402 may communicate with a chipset 500 that may control input to and output from processor 402. In this example, chipset 500 outputs information to output device 424, such as a display, and may read and write information to storage device 414, which may include, for example, magnetic media, and solid-state media. Chipset 500 may also read data from and write data to RAM 410. A bridge 502 for interfacing with a variety of user interface components 504 may be provided for interfacing with chipset 500. Such user interface components 504 may include a keyboard, a microphone, touch detection and processing circuitry, a pointing device, such as a mouse, and so on. In general, inputs to information handling system 122 may come from any of a variety of sources, machine generated and/or human generated.

Chipset 500 may also interface with one or more communication interfaces 426 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 402 analyzing data stored in storage device 414 or RAM 410. Further, information handling system 122 receive inputs from a user via user interface components 504 and execute appropriate functions, such as browsing functions by interpreting these inputs using processor 402.

In examples, information handling system 122 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc, that perform particular tasks or implement particular abstract data types. Computer-executable instructions, associated data structures, and program modules represent examples of the program code means for executing blocks of the methods disclosed herein. The particular sequence of such executable instructions or associated data structures represents examples of corresponding acts for implementing the functions described in such blocks.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 6:
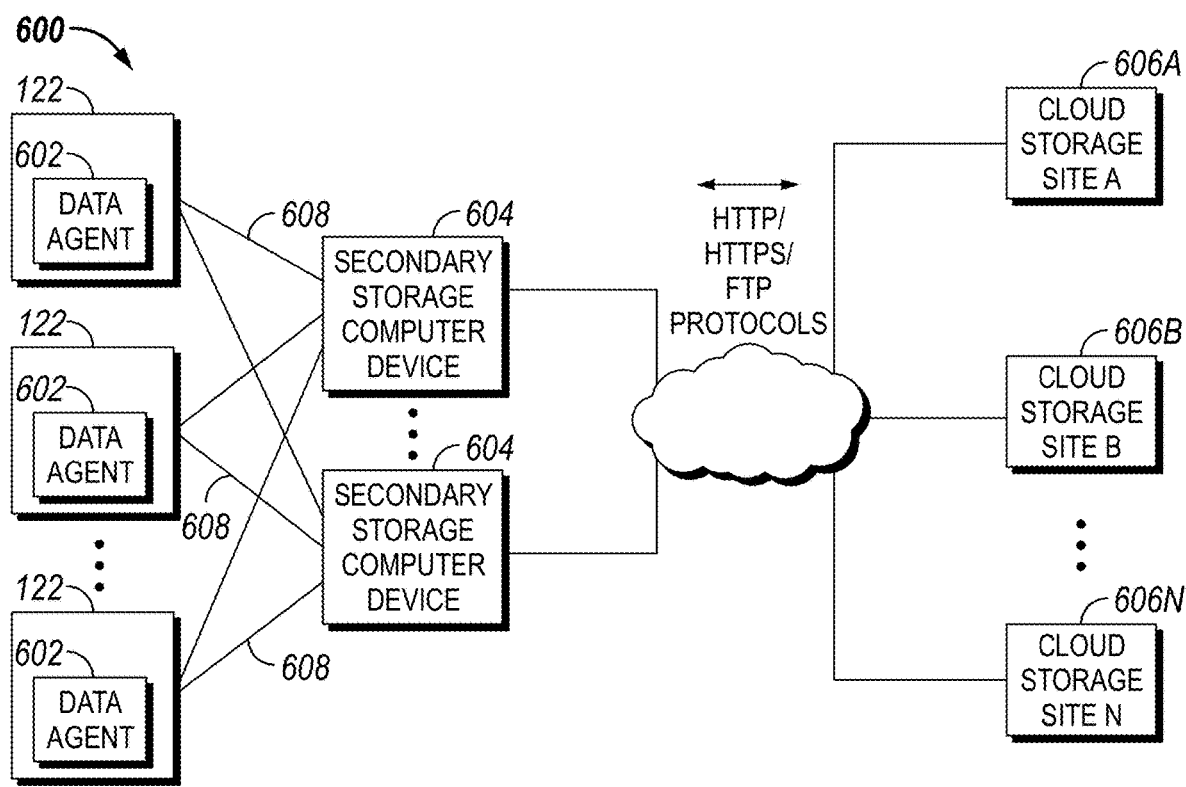
FIG. 6 illustrates an example of one arrangement of resources in an example cloud computing network.

FIG. 6 illustrates an example of one arrangement of resources in a computing network 600 that may employ the processes and techniques described herein, although many others are of course possible. As noted above, an information handling system 122, as part of their function, may utilize data, which includes files, directories, metadata (e.g., access control list (ACLS) creation/edit dates associated with the data, etc.), and other data objects. The data on the information handling system 122 is typically a primary copy (e.g., a production copy). During a copy, backup, archive or other storage operation, information handling system 122 may send a copy of some data objects (or some components thereof) to a secondary storage computing device 604 by utilizing one or more data agents 602.

A data agent 602 may be a desktop application, website application, or any software-based application that is run on information handling system 122. As illustrated, information handling system 122 may be disposed at any rig site (e.g., referring to FIG. 1), off site location, core laboratory, repair and manufacturing center, and/or the like. In examples, data agent 602 may communicate with a secondary storage computing device 604 using communication protocol 608 in a wired or wireless system. Communication protocol 608 may function and operate as an input to a website application. In the website application, field data related to pre- and post-operations, generated diagnosed trouble codes (DTCs), notes, and the like may be uploaded. Additionally, information handling system 122 may utilize communication protocol 608 to access processed measurements, operations with similar DTCs, troubleshooting findings, historical run data, and/or the like. This information is accessed from secondary storage computing device 604 by data agent 602, which is loaded on information handling system 122.

Secondary storage computing device 604 may operate and function to create secondary copies of primary data objects (or some components thereof) in various cloud storage sites 606A-N. Additionally, secondary storage computing device 604 may run determinative algorithms on data uploaded from one or more information handling systems 122, discussed further below. Communications between the secondary storage computing devices 604 and cloud storage sites 606A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 606A-N, the secondary storage computing device 604 may also perform local content indexing and/or local object-level, sub-object-level or block-level deduplication when performing storage operations involving various cloud storage sites 606A-N. Cloud storage sites 606A-N may further record and maintain, formation pressure measurements, proxy logs, map DTC codes, store repair and maintenance data, store operational data, and/or provide outputs from determinative algorithms that are located in cloud storage sites 606A-N. In a non-limiting example, this type of network may be utilized as a platform to store, backup, analyze, import, preform extract, transform and load ("ETL") processes, mathematically process, and apply machine learning models to formation pressure measurement data sets and/or proxy logs.

Figure 7:
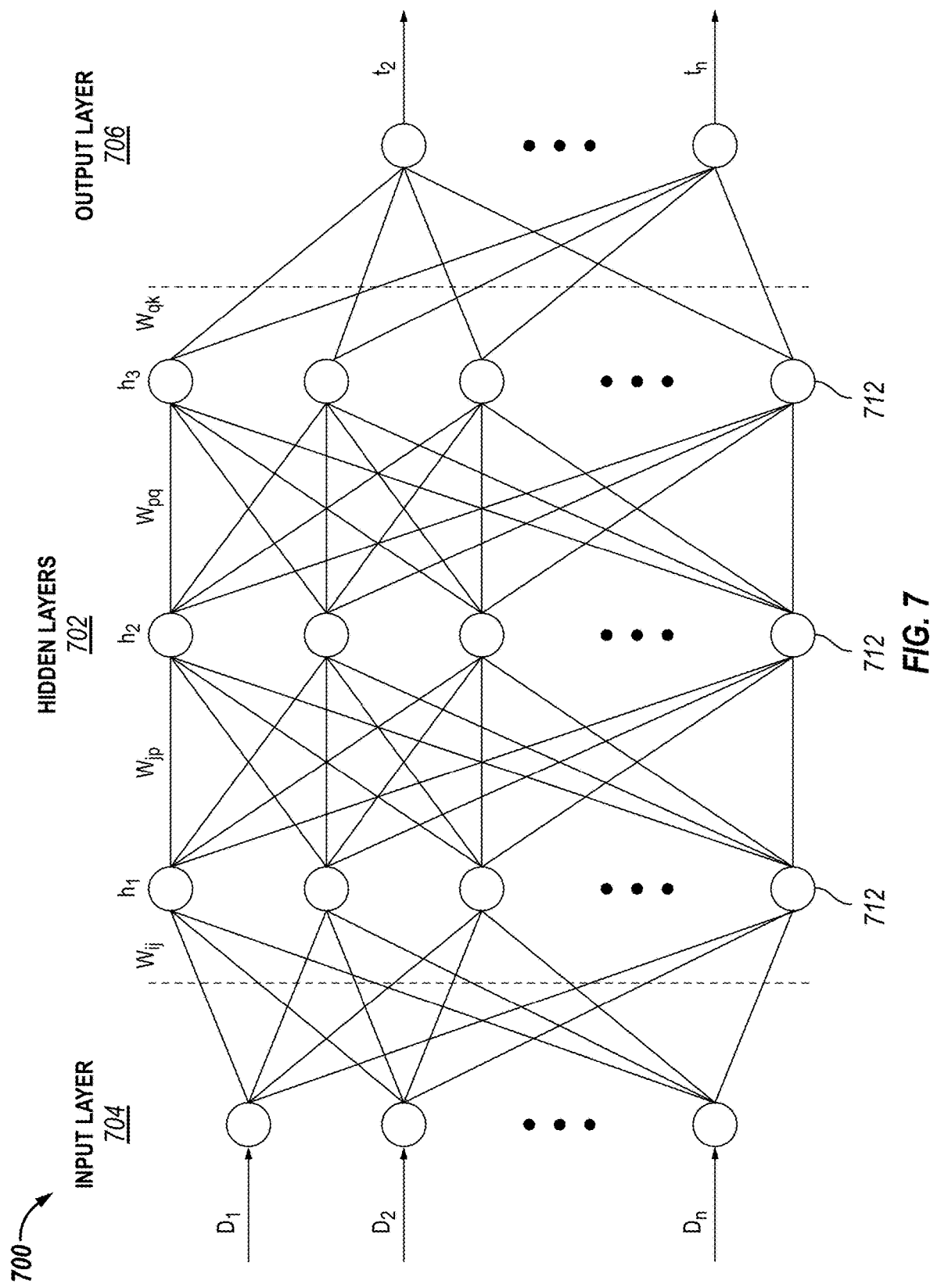
FIG. 7 illustrates an example machine learning model.

FIG. 7 illustrates a machine learning model which may be an empirically derived model which may result from a machine learning algorithm identifying one or more underlying relationships within a dataset. In comparison to a physics-based model, for example, Darcy's Law, which are derived from first principals and define the mathematical relationship of a system, a machine learning model may not be derived from first principals. Instead, a machine learning model may be derived from collected data. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a necessary component of a dataset for certain algorithms, not all algorithms require a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may include evaluating model performance according to whether the model is over-fit or under-fit. As it may be assumed that all datasets contain some level of error, it may be important to evaluate and optimize the model performance and associated model fit by means of model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and/or the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods include k-fold cross-validation, stratified k-fold cross-validation, bootstrapping, leave-one-out cross-validation, resubstituting, random sub-sampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions. Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated.

Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may include the model error, wherein the optimal set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may include whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset includes both independent and corresponding dependent values where the dependent value may be thought of as "the answer." that the model is seeking to predict from the underlying relationships in the dataset.

As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may include Neural Networks. K-Nearest Neighbors. Naïve Bayes. Decision Trees. Classification Trees, Regression Trees. Random Forests. Linear Regression. Support Vector Machines (SVM). Gradient Boosting Regression, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not include a dependent variable as the intended function of this type of algorithm is to identify one or more groupings or clusters within a dataset. In a non-limiting example, algorithms which may be utilized for unsupervised machine learning may include K-means clustering. K-means classification, Fuzzy C-Means. Gaussian Mixture. Hidden Markov Model. Neural Networks, and Hierarchical algorithms.

In some examples, a machine learning model, such as the neural network ("NN") 700 depicted in FIG. 7, may be utilized to interpret formation pressure measurements gathered from a subterranean formation. While FIG. 7 depicts neural network 700, any applicable machine learning algorithm, as previously described, could be used in accordance with the modeling objectives and the available data. In particular, unsupervised learning algorithms may be utilized to create models which identify fluid contacts and compartmentalization within the reservoir. Turning back to FIG. 7, neural network 700 is an artificial neural network with one or more hidden layers 702 between input layer 704 and output layer 706. As illustrated, input layer 704 may include any portion or combination of the previously acquired proxy measurements and/or formation pressure measurements obtained using a downhole pressure sampling tool/formation tester (e.g., downhole pressure sampling tool 100 in FIG. 1). Output layers 706 may identify fluid contact depths and information regarding compartmentalization of the reservoir. During operations, input data is taken by neurons 712 in first layer which then provide an output to neurons 712 within next layer and so on which provides a final output in output layer 706. Each layer may have one or more neurons 712. The connection between two neurons 712 of successive layers may have an associated weight. The weight defines the influence of the input to the output for the next neuron 712 and eventually for the overall final output.

The development of the above-mentioned machine learning models may be used to analyze formation pressure data and identify reservoir features from datasets which include formation pressure measurements such as the formation pressure measurements obtained using a downhole pressure sampling tool (e.g., downhole pressure sampling tool 100 in FIG. 1). A Bayesian Framework may be utilized in a workflow to obtain formation pressure measurements. In some examples, a Bayesian Framework may be performed on information handling system 122 (e.g., referring to FIG. 1) The Bayesian approach may be applied to process the data from one or more formation pressure measurements taken at one or more depth locations in subterranean formation 106. Statistically, Bayes' theorem describes the probability of an event given some prior knowledge related to this event and its condition. As previously described, a Bayesian Framework may be used to create a posterior distribution by updating a prior distribution in accordance with an acquired measurement and a likelihood function. More specifically, the Bayes rule derives the posterior probability of a quantity of interest given observed data related to that quantity, and a prior distribution of the quantity of interest. In some examples, the workflow and analysis, as described below, may be applied to other formation or formation fluid properties. In some examples, formation and formation fluid properties may be collected or sampled with devices such as non-optical fluid sensors and optical measurement tool (e.g., non-optical fluid sensor 348 and optical measurement tool 334 of FIG. 3). In other examples formation pressure measurements may be acquired by pressure transducers (e.g., pressure transducers 352 of FIG. 3). The examples as described herein may utilize pressures, however, it is applicable to other formation or formation fluid properties. For the formation pressure testing application, the quantity of interest may be the formation pressure (or pressure gradient) at different depth points. This may be denoted by a vector of formation pressures or pressure gradients at N depth points, as seen below:

$$g = [g_1, g_2, \ldots, g_N] \tag{6}$$

The prior distribution of g may be assumed as a multivariate normal distribution with mean g and covariance matrix $\Sigma$. p(g) may be written as:

$$p(g) = \frac{1}{\sqrt{(2\pi)^N |\Sigma|}} \exp\left(-\frac{1}{2}(g-\bar{g})^T \Sigma^{-1}(g-\bar{g})\right) \quad (7)$$

The likelihood of observing a gradient measurement $m_{i,obs}$ at the $i^{th}$ depth given a gradient vector g is given by:

$$p(m_i = m_{i,obs} | g) = \frac{1}{\sqrt{2\pi}\sigma_i} \exp\left(\frac{-(m_{i,obs} - g)^2}{2\sigma_i^2}\right) \quad (8)$$

where $\sigma_i$ is the precision (standard deviation) of the observation. Equation (8) assumes that for a given gradient vector, the gradient observation at one point is independent of the gradients at other points, which may also be known as conditional independence of the likelihood.

Applying Bayes' rule, the posterior distribution of the gradients having an observed set of K measurements $m = m_{obs}$ is given by $$p(g | m = m_{obs}) = \frac{p(g) \prod_{i=1}^{K} p(m_i = m_{i,obs} | g)}{p(m)} \quad (9)$$

p(m) is the probability distribution of the observed measurements m, which may be computed as $$p(m) = \int_g p(m|g) p(g) dg \quad (10)$$

This probability remains constant for all possible models being considered. The factor is the same for all hypotheses. Therefore, the posterior probability is proportional to the product of the likelihood function and the prior model as follows:

$$p(g|m = m_{obs}) \propto p(g) \prod_{i=1}^{K} p(m_i = m_{i,obs} | g) \quad (11)$$

The model parameters estimate that maximizes the posterior probability distribution is known as the maximum a posteriori estimate (MAP) and is given as $$\hat{g} = \text{argmax}_g \{p(g|m = m_{obs})\} \quad (12)$$

which may be computed in a closed form for normal distributions with observations being a linear function of the model parameters as the ones given in Equation (8). For more general nonlinear observations, statistical methods, such as Markov chain Monte Carlo may be used to compute the MAP estimate. In some examples, the application of non-linear models may be appropriate in order to consider effects such as fluid compressibility and compositional grading, or in contexts where the formation property under consideration is something other than pressure. For example, non-linear models may be better suited to handle the analysis of formation fluid properties.

The next measurement point may be determined from the posterior distribution as the depth point that is associated with the highest uncertainty as it relates to pressure, pressure gradient, or fluid property gradient. This may equivalently be described by the lowest marginal posterior PDF (i.e., probability distribution function) of $$g_i = \hat{g}_i \quad (13)$$

$$i_{opt} = \text{argmin}_i \{p(g_i = \hat{g}_i | m = m_{obs})\} \quad (14)$$

This also corresponds to the depth point that is associated with the highest diagonal element of the posterior covariance matrix (i.e., the highest variance). As described in the foregoing, the variance at each potential sampling location may be ranked, and a location with the "highest variance," may include any potential sampling location in a top percentage of the ranking.

Figure 8:
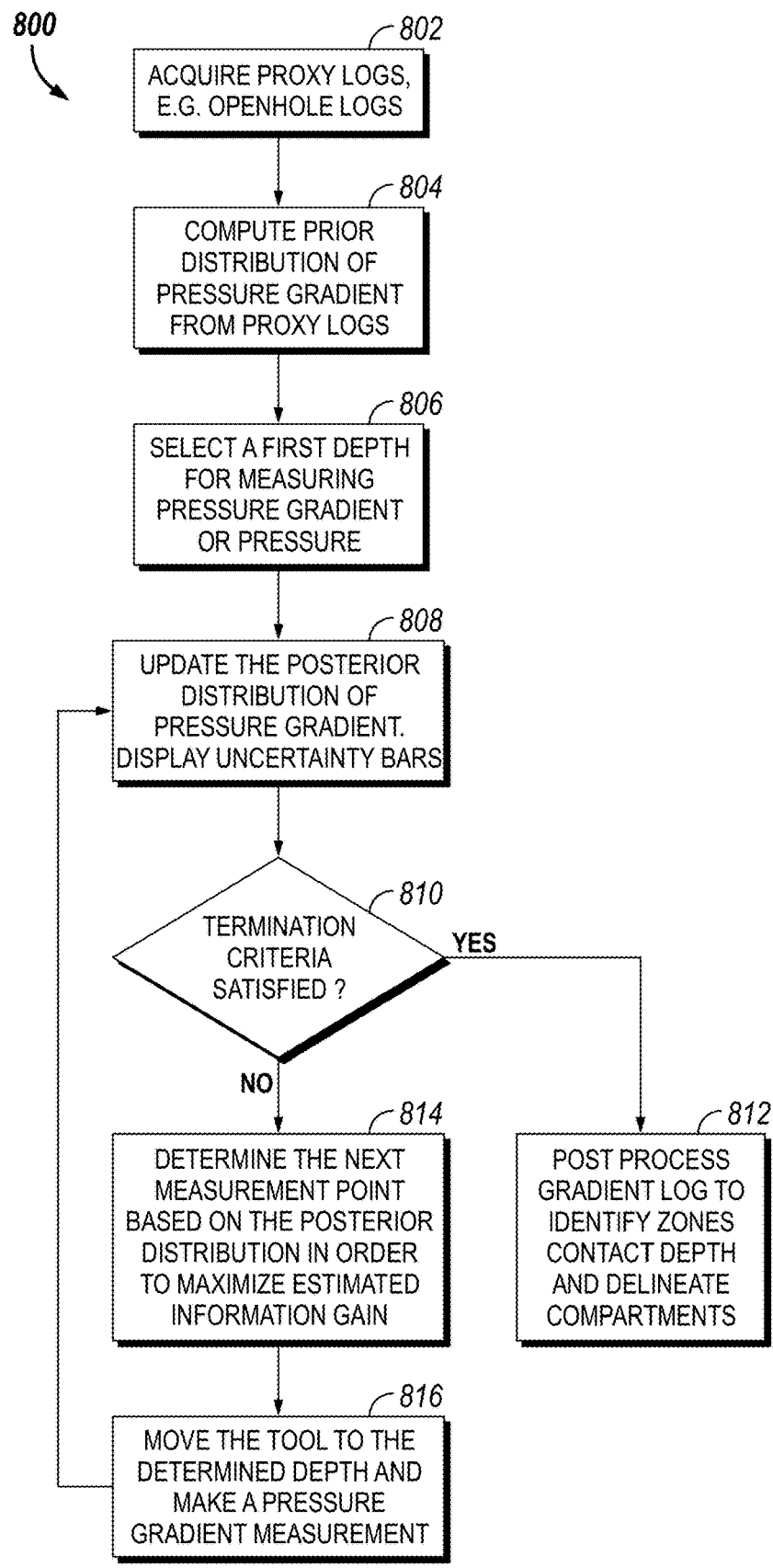
FIG. 8 illustrates a pressure testing work flow.

The Bayesian Framework described above may be utilized for pressure testing a subterranean formation as illustrated in workflow 800 of FIG. 8. It should be noted that at least a part of workflow 800 may be performed on information handling system 122 (e.g., referring to FIG. 1). Workflow 800 may begin with block 802 in which previously acquired logs may be selected for use as proxy logs. A proxy log may be a previously acquired log which is utilized to estimate formation pressure. In some examples, the logs used as proxy logs may be logs which were previously acquired on the well which is to be pressure tested. In this example, a well which is to be pressure tested may also be referred to as a well of interest. In some examples, the proxy logs may be acquired from wells located in the neighboring vicinity rather than from the well of interest. In some examples, wells which are located in the neighboring vicinity of the well of interest may be referred to as "offset wells." In some examples, wells which are believed to have analogous geology to the well of interest may additionally provide log data to the proxy log dataset. While proxy logs may not provide a direct measurement of formation pressure, they may contain data which may correlate with the formation pressure such that they may be used as analogs to estimate the formation pressure. The proxy logs may be improved with the addition of at least one or more pressure test or other formation fluid property measurement acquired from one or more test locations. In some examples, the proxy logs may be constructed with data from the current formation testing operation of the application. In further examples, proxy logs may be constructed according to a pre-supposed model based on certain assumptions. For example, a model may be constructed on the basis that pressure changes in a closed compartment are a function of the density of a fluid and gravity acting on that density. Such a model may assume reasonable estimates or ranges of estimates for the densities of the formation fluids. In further examples, the densities may be assumed to be at or between that of a gas density and that of a formation fluid brine. For example, previously acquired open hole logs such as resistivity logs, may provide insight as to the one or more fluids which may be contained at certain depths in a reservoir. In some examples, resistivity logs may identify water zones, gas zones, oil zones, or combinations thereof. In some examples, compartments of each zone may be estimated. In other examples contacts of fluid types may be estimated. In additional examples the pressure distribution or distribution of other fluid properties may be estimated. Geologic context may be derived from the distribution such as but not limited to wettability or capillary pressure that affect different phases of fluids differently according to known physics models. As another example, the distribution of other properties such as but not limited to asphaltenes concentration may provide geologic context of location of tar mats. In yet another example the distribution of other fluid concentrations may provide information about best production strategies in order to minimize flow assurance issues. In some examples, flow assurance issues may be caused by corrosive materials or fluids. In some non-limiting examples, corrosion issues may be caused by carbon dioxide distribution, hydrogen sulfide distribution, or by total organic acids distribution. In other examples, flow assurance issues may be caused by scaling issues from inorganic ions such as but not limited to barium and sulfide, or calcium and carbonate, or magnesium and carbonate or iron and sulfide. Understanding the distribution of pressures and properties within the system (e.g., the gradient and distribution properties) may help identify potential operational issues. In some examples, the potential operational issues may prove to be prohibitive to the development of the asset while in other examples the potential operational issues may be strategically mitigated by implementing certain production strategies. In further examples, information from previously acquired logs such as resistivity logs may be used to create the initial estimate of formation pressure at various depths in the formation. In some examples, a hydrostatic gradient may be estimated for a given formation depth using any assumed fluid density. For example, a generic gradient which may be assumed for a formation containing exclusively salt water may be 0.465 pounds per square inch per foot ("psi/ft") or 10.51 Kilopascal/meter ("kPa/m"). Separately, gamma ray logs may indicate the lithology or rock-type present in a formation. In some examples, certain rock types (i.e., shales, gypsum, anhydrites, evaporites, and/or highly cemented sedimentary rocks) may prove to be effectively impermeable (i.e., having such low permeabilities to where flow within or across the porous media of the rock is inhibited or prevented). As a result, some rock types may create a pressure seal between the rock formations directly above and/or directly below the formation. In some examples, areas that are considered "over-pressured," or "under-pressured," may be located in the vicinity of these formations which function as pressure seals. This information may prove useful when creating a depth-based estimate of formation pressure. In some examples, the proxy log may be created from an estimate of pressure based on a presupposed model. In further examples, such a model, in the simplest fashion may be a single uniform pressure or pressure gradient wherein the model may be supposed from at least one pressure measurement or pressure estimate.

Figure 9:
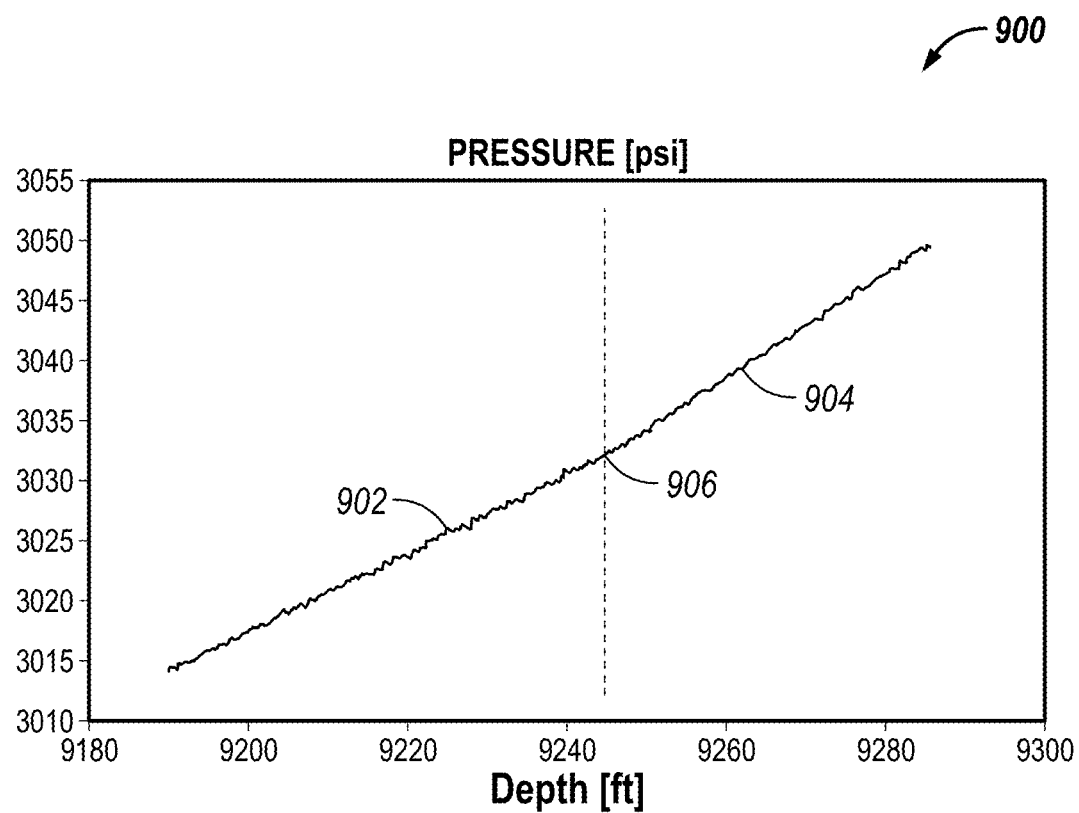
FIG. 9 illustrates a two-fluid pressure gradient model.
Figure 10A:
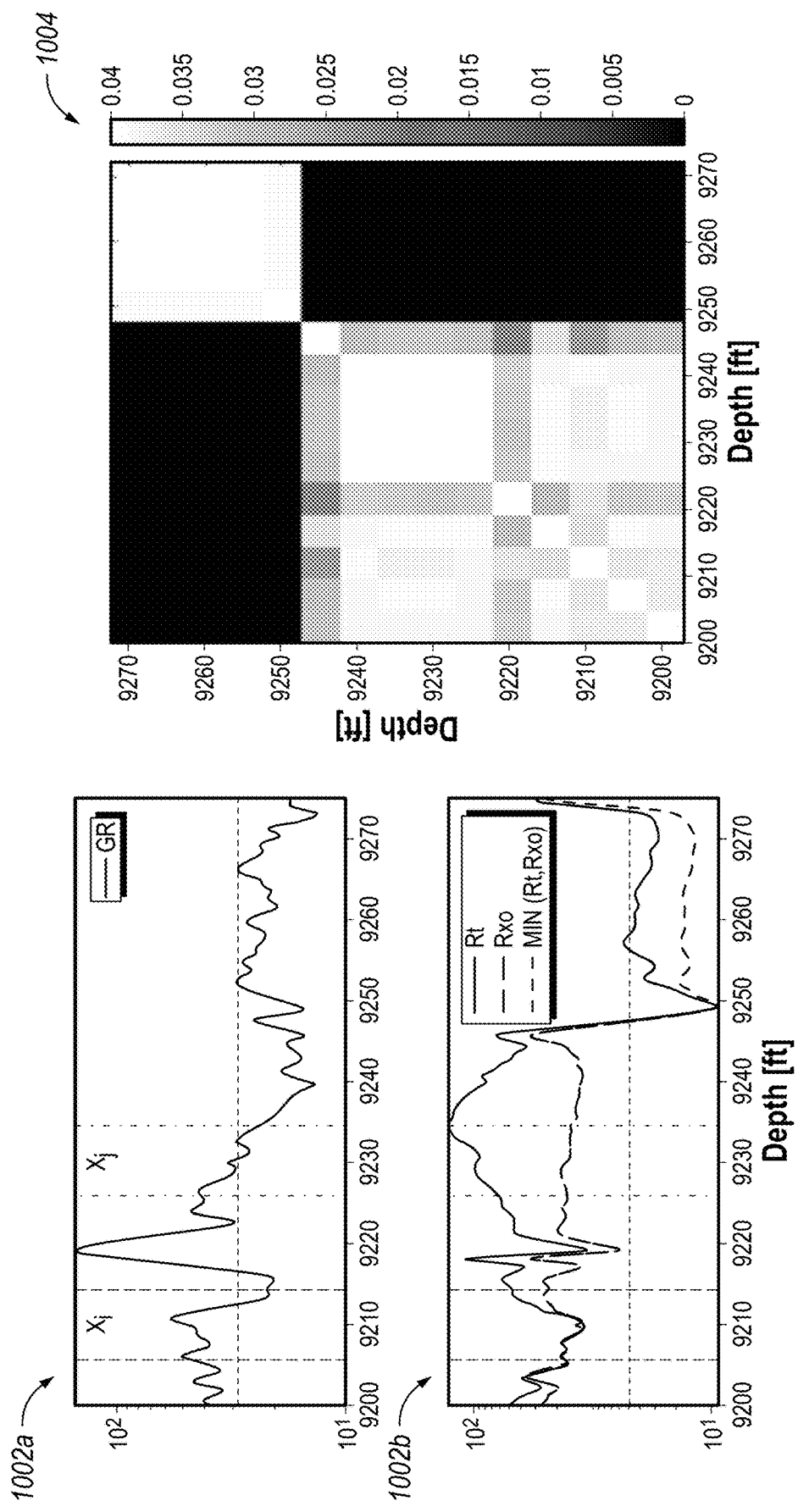
FIGS. 10A and 10B illustrates covariance matrices developed from log data.
Figure 10B:
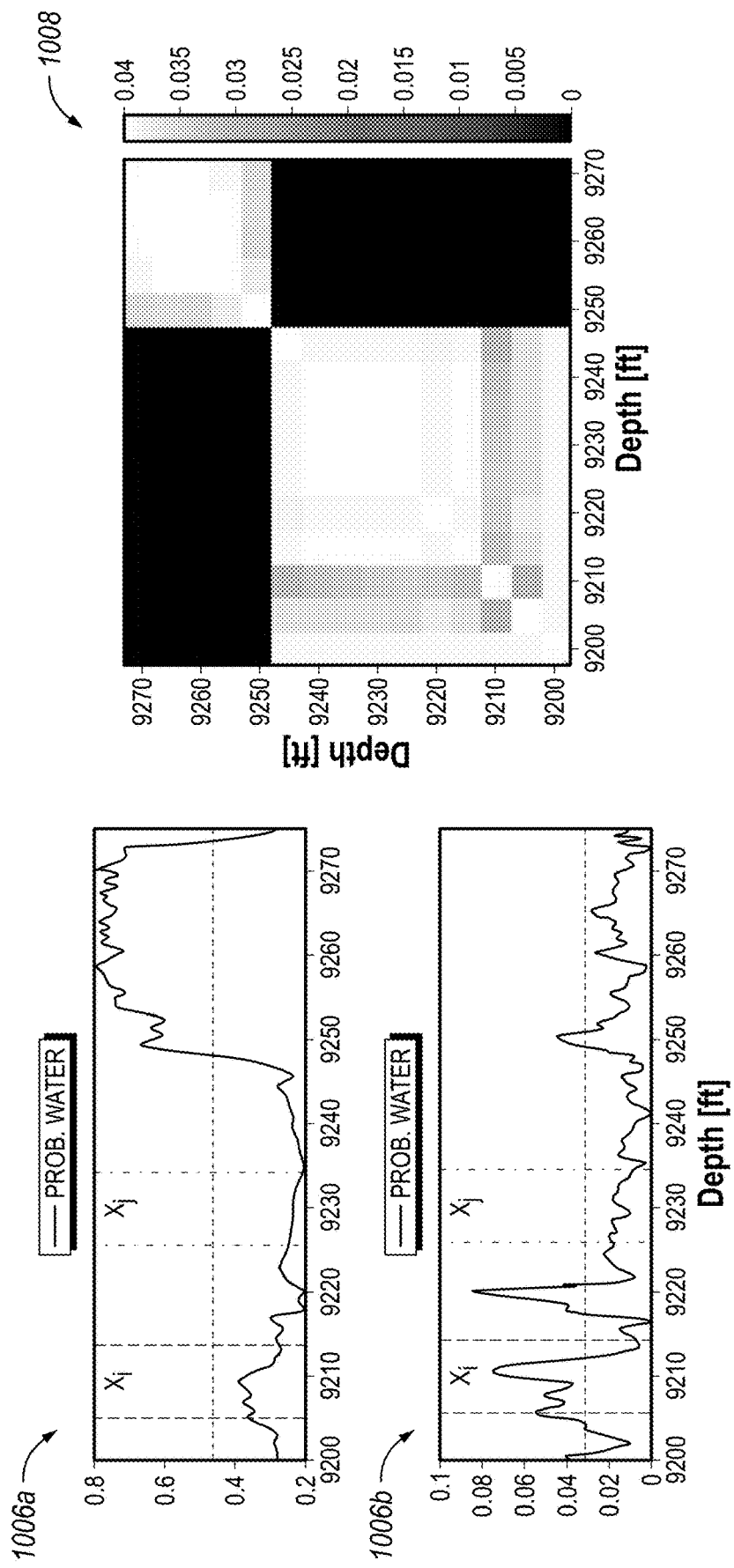

In block 804 information extracted from the proxy logs may be used to compute a prior distribution of formation pressure. The prior distribution of formation pressure may also be an initial estimate of the formation pressure at various depths within a formation of interest. In further examples, the formation pressures may be replaced with formation pressure gradients. FIG. 9 illustrates an example of an initial formation pressure distribution 900 which may be used as a prior distribution of formation pressure. As depicted, the pressure system includes a first gradient 902 and a second gradient 904 along with an interface 906 which is located at a depth of 9,245 feet. The initial estimated gradient for first gradient 902 is 0.328 psi/ft and second gradient 904 is estimated to be 0.436 psi/ft. The prior distribution may correlate the values of the various logs selected in block 802 to generate a covariance matrix as depicted in FIGS. 10A and 10B. In some examples, the prior distribution may be determined from other methods such as principal component analysis, partial least squares, Monte Carlo methods, and simulation methods. In FIG. 10A, gamma ray log 1002a and resistivity log 1002b are used to compute a covariance matrix 1004 from raw log data of gamma ray 1002a and resistivity logs 1002b. In FIG. 10B, the probability of water log 1006a and the probability of gas log 1006b may be derivatives or interpretations of raw data logs such as gamma ray log 1002a and resistivity log 1002b. Probability of water log 1006a and probability of gas log 1006b may depict the percentage likelihood of the presence various fluids (i.e., oil, water, or gas) within subterranean formation 106 (e.g., referring to FIG. 1) in relationship to the formation depth. The information from probability of water log 1006a and probability of gas log 1006b may be used to generate covariance matrix 1008. A covariance matrix may be determined from a correlation matrix where the correlation matrix is computed as follows:

$$\mathrm{corr}_{i,j} = \frac{\sum_{n=1}^{N}(x_{i,n}-\mu)(x_{j,n}-\mu)}{\sqrt{\sum_{n=1}^{N}(x_{i,n}-\mu)^2 \sum_{n=1}^{N}(x_{j,n}-\mu)^2}} \quad (15)$$

The correlation matrix may be scaled by the standard deviation of the formation pressure gradient. In some examples, the standard deviation may correspond to more than one fluid. For example, a gradient standard deviation of 0.2 psi/ft may be assumed around a mean value of 0.4 psi/ft to cover different formation fluids (i.e., oil and water).

$$\mathrm{cov}_{i,j} = \mathrm{corr}_{i,j} \times \sigma_i \times \sigma_j \quad (16)$$

In some examples, probability of water log 1006a and probability of gas log 1006b may incorporate the raw log data of gamma ray 1002a and resistivity logs 1002b. In further examples, Equation 16 may be used to generate a covariance matrix from both raw log data (i.e.: gamma ray 1002a and resistivity logs 1002b in FIG. 10A) and interpreted log data (e.g. Probability of water log 1006a and probability of gas log 1006b in FIG. 9B). Returning to the workflow of FIG. 8, covariance matrix 1004 and/or covariance matrix 1008 may be used to generate a prior distribution as detailed in block 804. Since the measurements in the proxy logs from block 802 may be obtained at various depths within the wellbore, the correlations identified in the covariance matrix may be related as a function of depth. Using the covariance matrix, a first batch of potential formation pressure measurement locations may be identified as candidates for a formation pressure measurement. In some examples, the first batch of potential formation pressure measurement locations may be identified using other methods such as principal component analysis, partial least squares, Monte Carlo methods, and simulation methods. In block 806, a first location, which is associated with a specific depth, may be selected for a formation pressure measurement. Alternatively, a first location for a formation pressure gradient measurement may be selected in block 806. It may be assumed that each local gradient measurement requires two formation pressure measurements to be acquired.

In block 808, the formation pressure measurement obtained from the location (i.e., depth) selected in block 806 may be utilized to update the posterior distribution of formation pressure or pressure gradients. Additionally, the level of uncertainty for each candidate formation pressure measurement location may be computed and displayed in the form of error bars. The posterior distribution captures the correlation among different depth points through a covariance matrix, using the methods described above. In block 810, the level of uncertainty and/or the differential information gain from the remaining potential testing locations (i.e., depths) may be assessed to determine if a termination criterion has been satisfied. For example, additional potential testing locations may be assessed to determine if the information provided by sampling the locations is incrementally small so as to be considered diminishing returns with respect to additional testing. In other examples, the diminishing rate of decrease of the differential entropy (DE) may be used as a termination criterion. The differential entropy (DE) of the posterior distribution could be used as follows:

$$DE = E[-\log(p(g|m=m_{obs}))] \quad (17)$$

For a multivariate normal distribution, the DE is given as $$DE = \tfrac{1}{2}\ln\{(2\pi e)^N |\Sigma_{post.}|\} \quad (18)$$

where $\Sigma_{post.}$ is the covariance matrix of the posterior distribution. As sequential acquisitions are made, DE continues to decrease (since entropy is a measure of randomness of the random variable). As such, the diminishing rate of decrease of DE may be used as a termination criterion. In other examples, the maximum percentage of uncertainty ("MAXU %") may be used as a termination criterion. The MAXU % may be the maximum standard deviation as a percentage of the corresponding maximum a posteriori estimate, or MAP (i.e., Equation 12) which may further be determined for each additional formation pressure measurement that is acquired. Alternatively, the root mean square difference in percentage between MAP estimates in successive iterations ("RMSD %"), which may also be used as a termination criterion. A difference below certain threshold (e.g. 10%, 5%, 2% or 1%) may signal diminishing returns and therefore trigger termination. In this example, "successive iterations," may relate to the recalculation of the posterior distribution with each successive or additional formation pressure sample that is gathered. In some examples, the termination criterion may provide an estimate of the remaining information about the system which may be determined from additional testing. In further examples, this remaining information to be gained may be assessed in view of the gained knowledge about the system in conjunction with the intended use of the gained knowledge. In some examples, additional testing may be viewed with respect to the cost for additional testing which may further relate to diminishing returns with respect to the additional cost which would be incurred by the additional testing as a termination criteria. In other examples, termination criteria for the sufficiency of system knowledge may be judged with respect to the system itself and may also be adjusted in real-time as to termination criteria. For instance an initial termination criteria may be that a contact point between oil and water be known with an accuracy of +/−5 feet, however, if it is discovered that oil is of low quality, the subterranean formation is of low quality, the present hydrocarbon is of a different phase than originally anticipated (e.g., oil instead of gas or gas instead of oil), or the hydrocarbon is non-existent, then +/−5 feet may no longer be the termination criteria. In some examples, the termination criteria may be the system understanding that the asset does not meet the economic expectation.

If a termination criterion has been satisfied, then workflow 800 proceeds to block 812 where the formation pressures or pressure gradient log is post-processed to identify contact depths and/or to delineate compartments. The contact depths identified in block 812 may relate to zones that predominately comprise the same fluid or a consistent ratio of fluids. For example, it may be common for formation water (i.e., connate water) to be present throughout a reservoir including in areas that are predominately saturated with oil or gas. Likewise, areas that are predominantly gas bearing may additionally include some portion of oil in the pore space. The compartments in block 812 may refer to geologically isolated portions of a formation which are bounded by sealing boundaries which may function as a no-flow boundary. In some examples the foregoing compartments may be referred to a formation compartments. In some examples, an unsupervised machine learning algorithm may be applied to the acquired formation pressure points to determine the contact depths and/or to delineate any compartments that may be present. In other examples, the formation pressure points may be replaced with or augmented with formation pressure gradients which may further be utilized in a similar manner with an unsupervised machine learning algorithm. Neural Network 700 of FIG. 7 is an example of an algorithm which may be used in unsupervised machine learning. In further examples, the unsupervised machine learning algorithm may be a clustering algorithm. As detailed in the foregoing, some examples of clustering algorithms may include K-means clustering. Principal Component Analysis ("PCA"). K-means classification. Fuzzy C-Means. Gaussian Mixture, Hidden Markov Model. Neural Networks, and Hierarchical algorithms. In some examples, supervised algorithms may be used to discover the gradient or fluid property distribution relations of the subterranean formation system. In other examples, machine learning algorithms may be used to define proxy logs or replace the covariance matrix as described above. In some examples, if compartments are identified within the formation, curve fitting may be applied to the acquired formation pressure measurements to estimate a formation pressure gradient within each compartment. In other examples local gradients identified during the formation pressure testing workflow may be utilized in conjunction with or in lieu of the formation pressure measurements to estimate the formation pressure gradients within each compartment.

If the termination criterion of block 810 is not satisfied, then workflow 800 proceeds to block 814 where the posterior distribution is utilized to determine a next location to acquire a formation pressure measurement such that the next location maximizes the estimated information gain. In some examples, the next location may be selected according to the location in the posterior distribution with the highest variance. In further examples, selecting the location in the posterior distribution with the highest variance may include ranking the potential sampling points from highest variance to lowest variance and selecting a sampling point from the potential sampling points which rank in a top percentage by variance as described above. In other examples, the next location may be selected according to the location in the posterior distribution with the highest projection of the first principal component of the posterior covariance matrix. The first principal component may be identified in singular value decomposition of the posterior covariance matrix. Each element of the first principal component can be interpreted as the projection of that component on one depth location. The next measurement location may be selected as the location corresponding to the largest element in the first principal component. Principal component analysis ("PCA") may be a linear vector rotation of a dataset of related variables such as a set of logs according to eigenvectors that describe the greatest direction of variation for the first principal component followed by principal components that describe the greatest direction of the residual from subsequent principal components and which are orthogonal to all subsequent principal components. Partial Least Squares (PLS) describes the rotation of greatest subsequent variation as related to a single predictor variable or multiple predictor variables. In a non-limiting example. PLS may utilize log information to directly describe pressure variation in offset wells. Once the next measurement location is selected in block 814, the downhole pressure sampling tool 100 (e.g., referring to FIG. 1) is moved to the determined depth and a formation pressure measurement or pressure gradient measurement is acquired in block 816. The measurement acquired in block 816 is then utilized to update both the posterior distribution of the formation pressure gradient along with the uncertainty bars in block 808. From there, workflow 800 works in successive iterations between identifying sampling locations, gathering samples, updating the posterior distribution, and determining whether or not the termination criterion has been satisfied until the uncertainty has been minimized enough that the selected uncertainty criterion is satisfied.

Figure 11A:
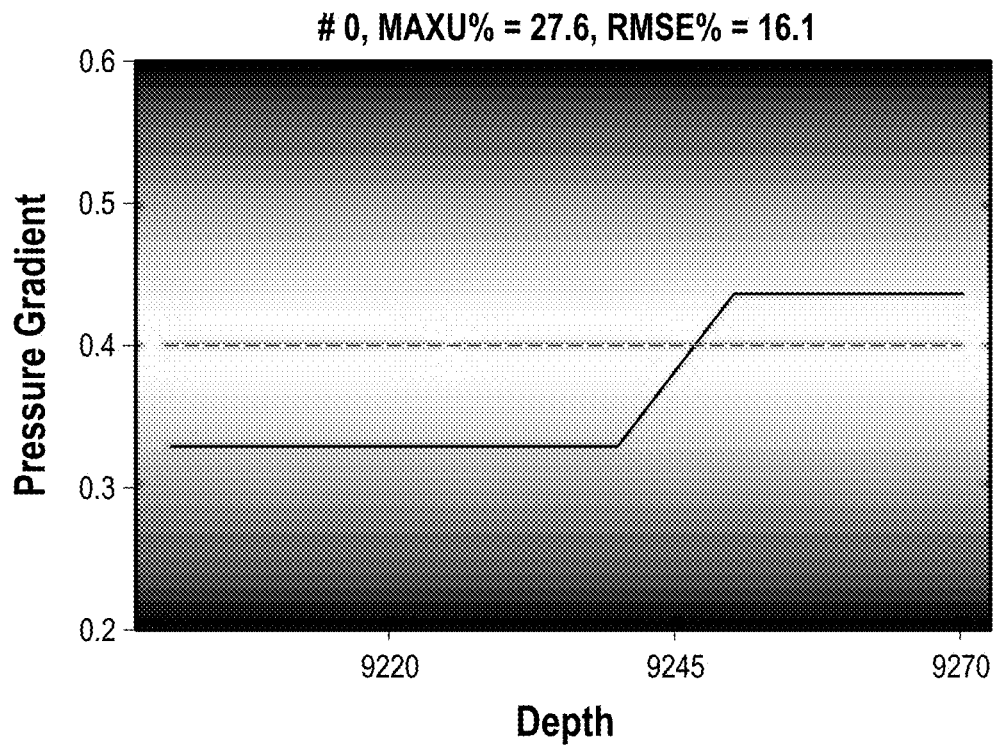
FIGS. 11A-11L illustrates a prior distribution and posterior marginal distributions for sequential selection of formation pressure measurements.
Figure 11B:
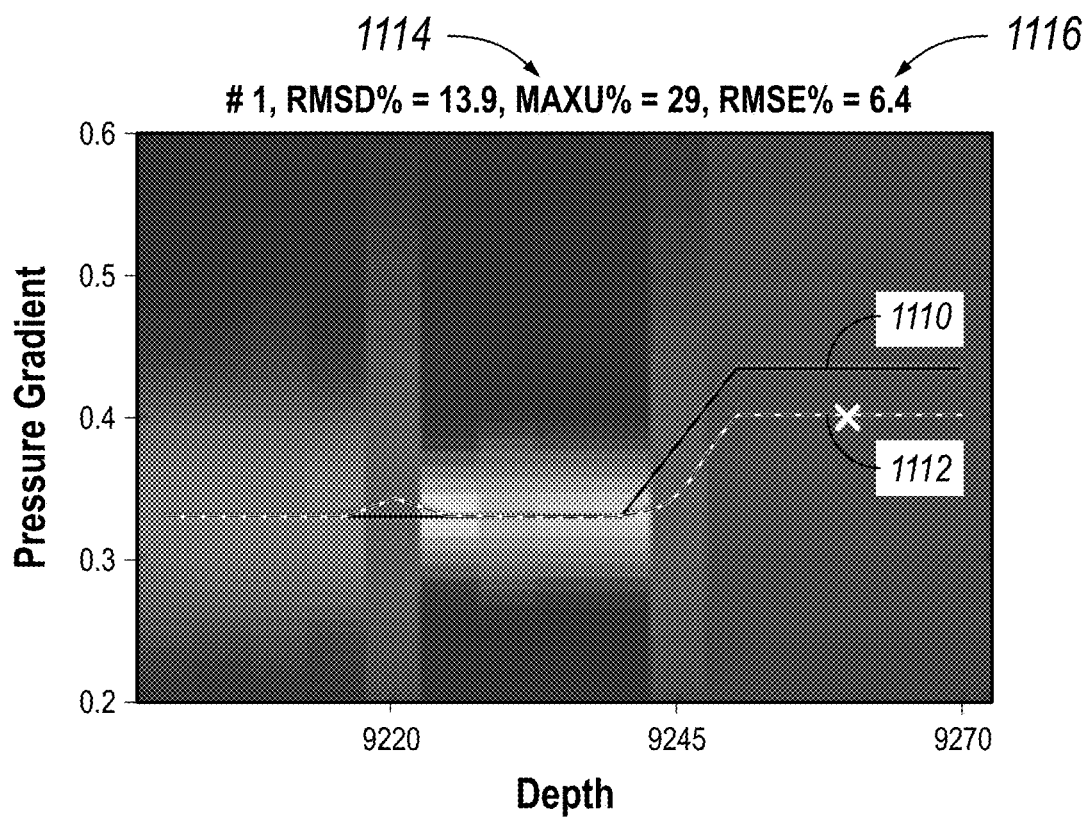
Figure 11C:
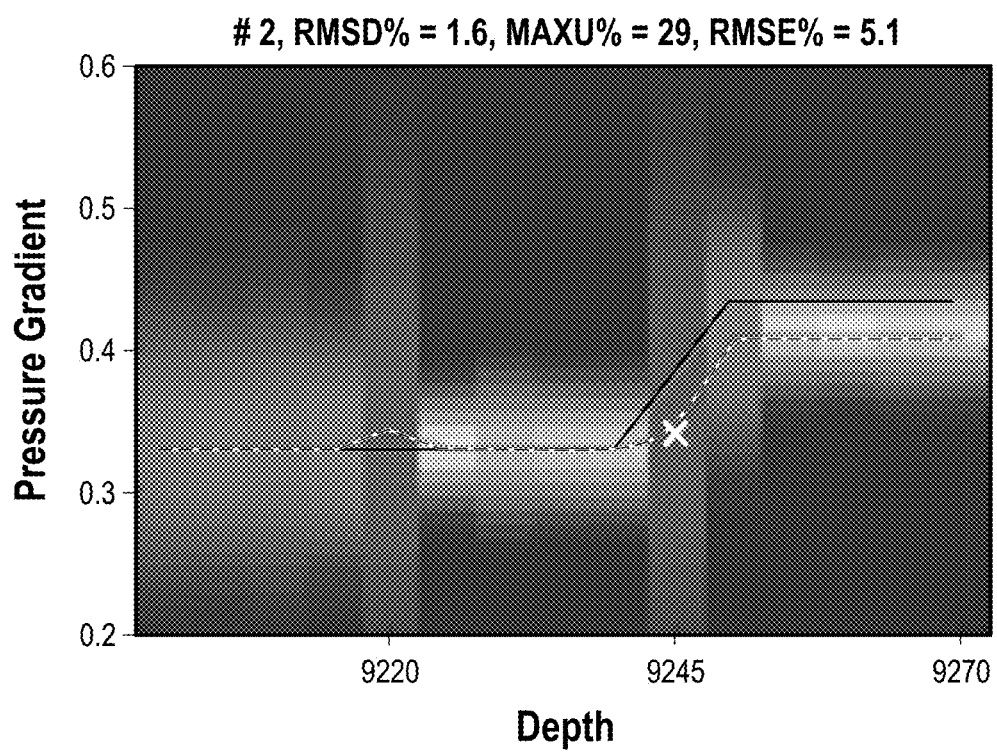
Figure 11D:
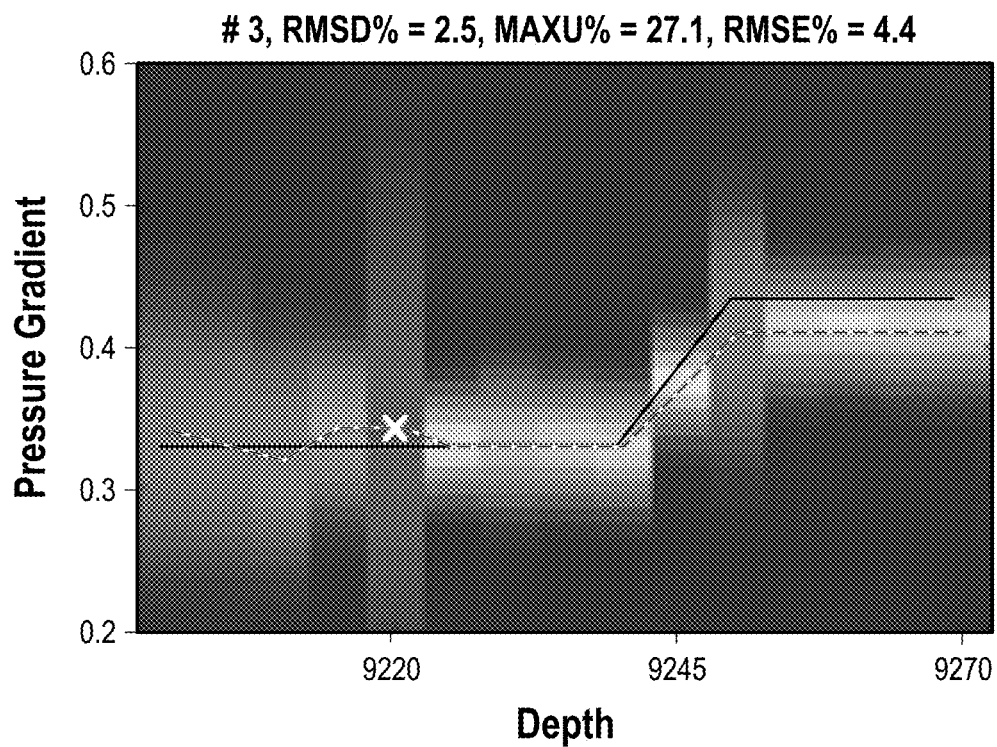
Figure 11E:
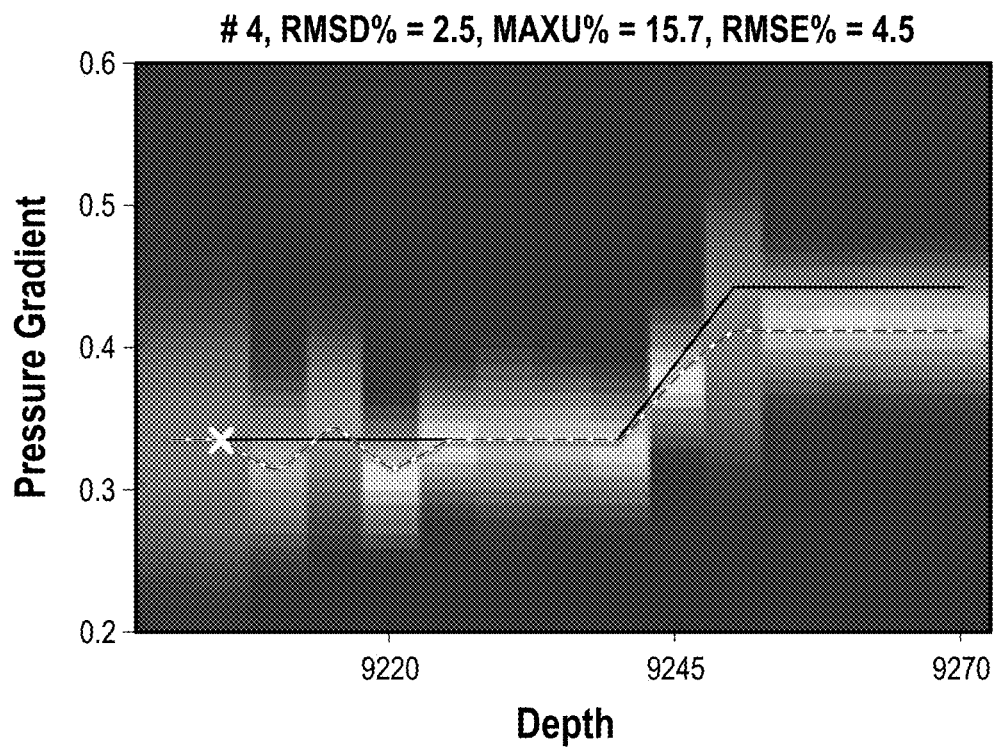
Figure 11F:
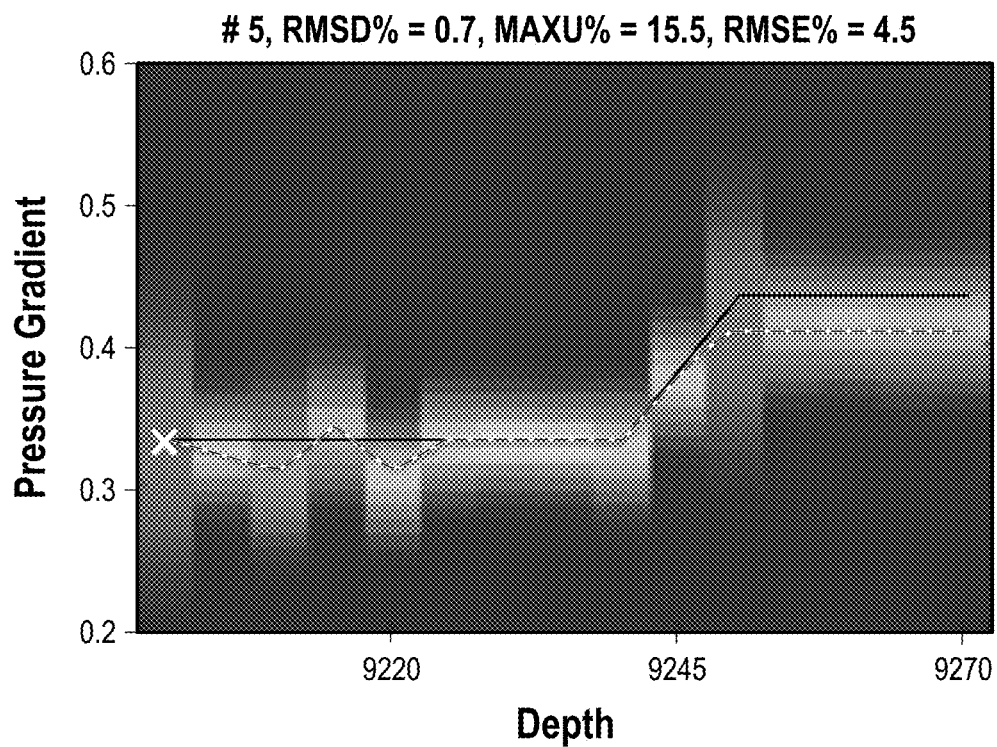
Figure 11G:
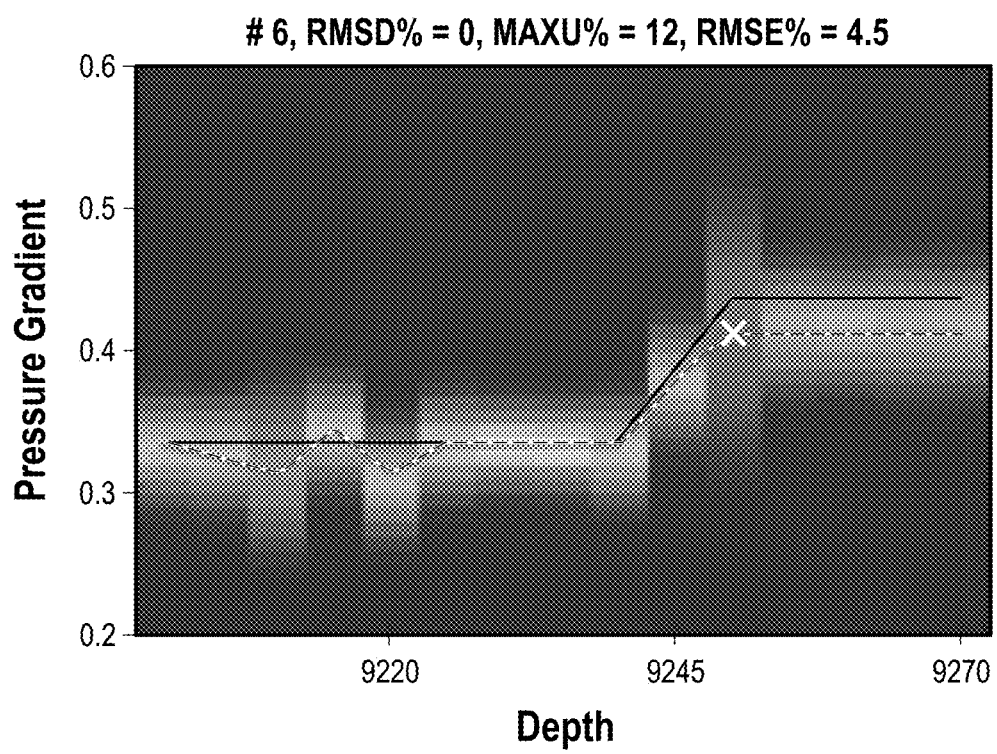
Figure 11H:
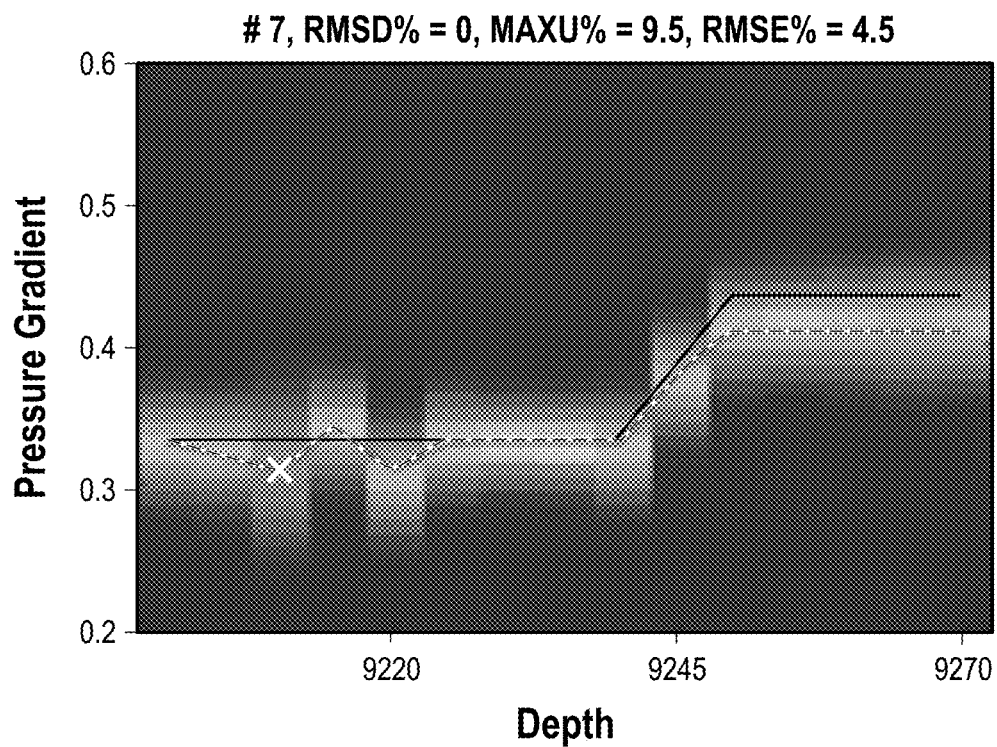
Figure 11I:
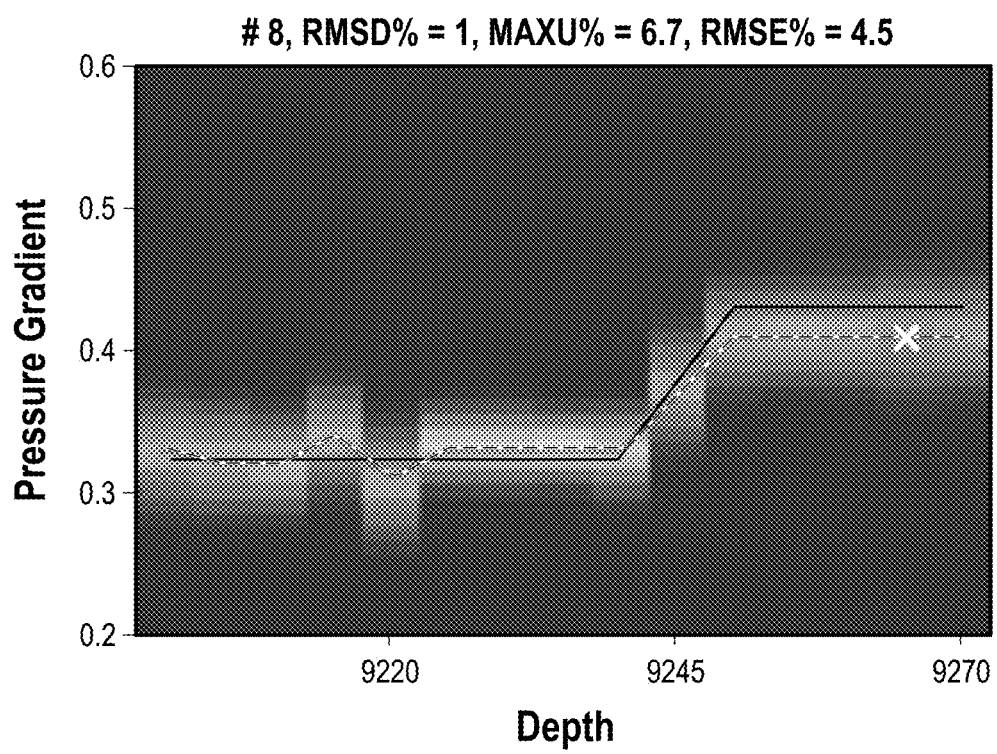
Figure 11J:
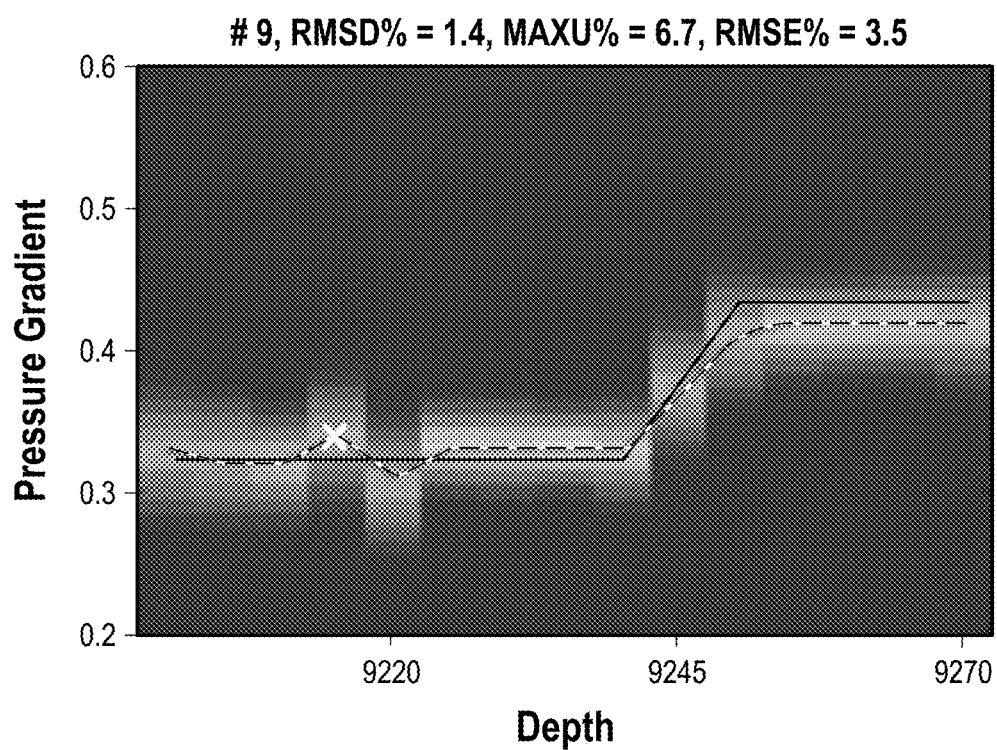
Figure 11K:
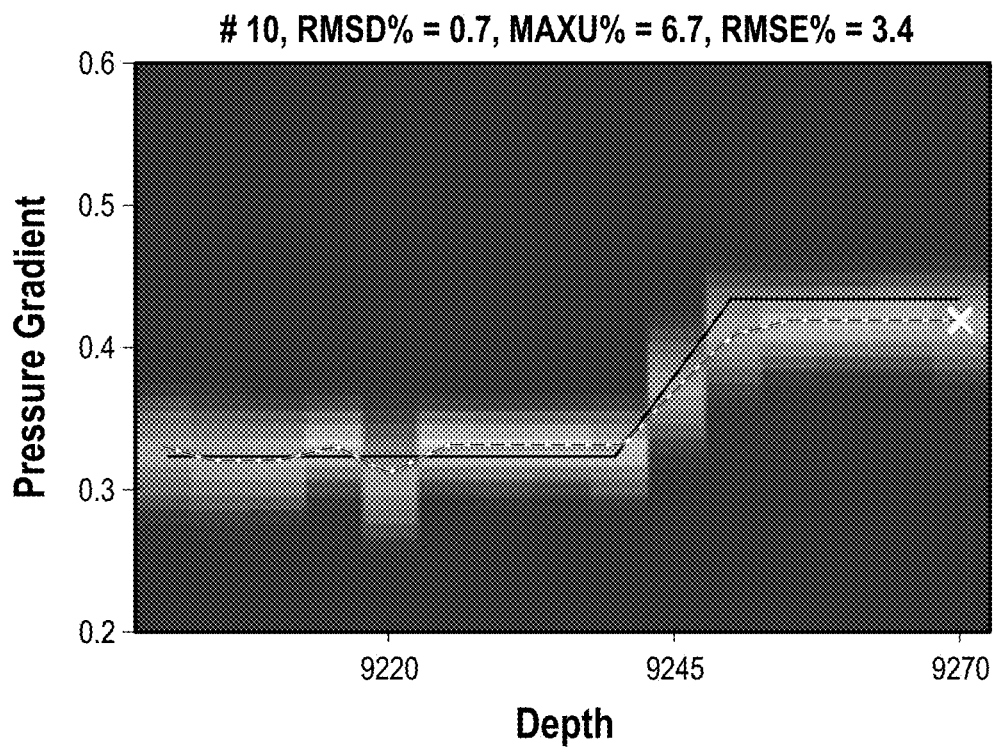
Figure 11L:
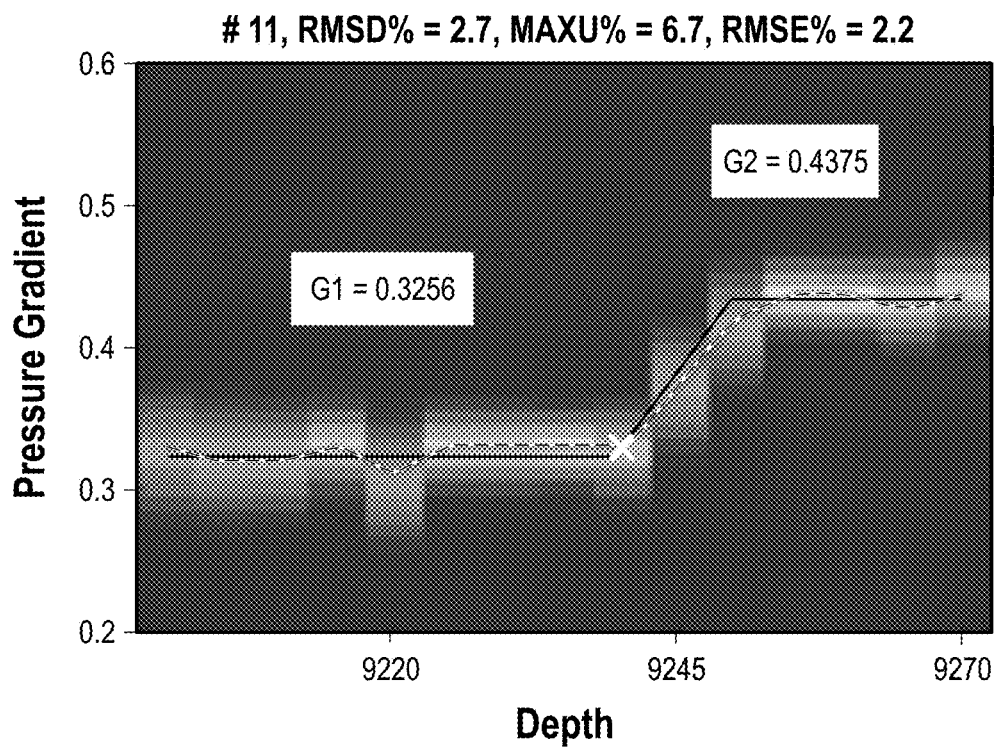

FIGS. 11A through 11L display images rendered from prior and posterior distributions which may exemplify the collection of multiple formation pressure tests in accordance with successive iterations of workflow 800. In some examples, the images of FIGS. 11A through 11L may be formed and render on information handling system 122 (e.g., referring to FIG. 1). In FIGS. 11A-11L, the sequential selection of formation pressure gradient measurement depths or formation pressure measurement depths starts with a prior distribution in FIG. 11A and terminates in FIG. 11L. Each of the images in FIGS. 11A through 11L represents the acquisition of an additional formation pressure measurement or pressure gradient measurement in accordance with the workflow supported by a Bayesian Framework as detailed above. After each successive measurement is acquired, the posterior marginal distributions for all of the candidate testing locations within the depth interval of interest are computed and may be plotted as an image. However, in some examples the numerical information from the posterior marginal distributions may be utilized without the creation or rendering of an image. For example, the prior distribution displayed in FIG. 11A represents the prior distribution developed from selected proxy logs as described for block 802 and block 804 (e.g., referring to FIG. 8). Once a formation pressure first measurement is acquired, the posterior distribution is updated to reflect the updated uncertainty as displayed in FIG. 11B. If a termination criterion is not satisfied, then an additional measurement location is identified utilizing workflow 800, an additional measurement is taken, and the posterior distribution is again updated to reflect the updated uncertainty as displayed in FIG. 11C. A true gradient line 1110 is displayed for reference as well as a calculated MAP estimate 1112. The MAXU % 1114 is calculated and displayed for each progressive iteration. In some examples, the iterative portion of the workflow as described in workflow 800 may terminate when the maximum uncertainty (e.g., MAXU % 1114) is below a certain percentage or threshold. In some examples the iterative workflow may terminate when the maximum uncertainty is below 50%. In other examples the iterative workflow may terminate when the maximum uncertainty is below 40%, 30%, 25%, 20%, 15%, 10%, 5% or 1%. Also depicted in FIG. 11A is the RMSD %, which as described in the foregoing may additionally be used as a termination criterion. In some examples, the root-mean-square error ("RSME") may be utilized as a termination criterion. For example, the RSME % 1116 is displayed in FIG. 11A-11L and may additionally be used as a termination criterion. As depicted, RSME % 1116 may generally correlate with MAXU % 1114.

TABLE 1

| Step | Gradient Measurement Depth [ft] | Pressure Measurement Depths | | | Maximum Uncertainty (σ/μ) % | RMS Difference Relative to Previous MAP % | RMS Error Relative to True % |
| --- | --- | --- | --- | --- | --- | --- | --- |
| | | A | B | C | | | |
| 1 | 9225 | 9217.5 | 9232.5 | | 29 | 14 | 6.4 |
| 2 | 9260 | 9252.5 | 9267.5 | | 29 | 1.6 | 5.1 |
| 3 | 9245 | 9232.5 | 9252.5 | | 28 | 2.5 | 4.4 |
| 4 | 9220 | 9217.5 | 9227.5 | | 16 | 2.5 | 4.5 |
| 5 | 9205 | 9197.5 | 9217.5 | | 15 | 0.7 | 4.5 |
| 6 | 9200 | 9197.5 | 9207.5 | | 12 | 0 | 4.5 |
| 7 | 9250 | 9242.5 | 9252.5 | | 10 | 0 | 4.5 |
| 8 | 9210 | 9197.5 | 9207.5 | 9217.5 | 7 | 1 | 4.5 |
| 9 | 9265 | 9252.5 | 9267.5 | 9272.5 | 7 | 1.4 | 3.5 |
| 10 | 9215 | 9207.5 | 9217.5 | | 7 | 0.7 | 3.4 |
| 11 | 9270 | 9267.5 | 9272.5 | | 7 | 2.7 | 2.2 |

Table 1 displays an example of the gradient measurement depths and the corresponding formation pressure measurement depths as selected in accordance with workflow 800 (e.g., referring to FIG. 8). It may be assumed that each local formation pressure gradient measurement requires the acquisition of two pressure measurements. The separation between the formation pressure measurement depths is initially set to fifteen feet (4.57 meters), however, as the workflow proceeds, previously acquired formation pressure measurements may be reused to compute the gradient in subsequent iterations. The unique formation pressure measurement depths are identified in bold, and the table contains nine formation pressure measurements.

Improvements from the methods and systems over current technology described above comprise a Bayesian workflow to prioritizing depth points for formation pressure testing in order to maximize the information gain from each point. In some examples, maximizing the information gain pertains to improving the rate of information gain. The workflow uses a variety of data from open hole logs which may include both raw log data and/or interpreted log data to function as proxies to create an estimate of formation pressure within a subterranean formation of interest. The proxy logs may further be used to calculate a prior distribution which may be utilized in a workflow which may reduce the time required in a process for obtaining formation pressure measurements. As such, the proxy logs may be refined with each successive formation pressure test or formation fluid property test. The prior distributions capture the correlation among different depth points for one or more reservoir properties through a covariance matrix. As successive formation pressure measurements are acquired, posterior distributions are computed and used to determine the depth points where the next formation pressure measurement should be obtained such that the expected information gain from any successive formation pressure measurements is maximized. The formation pressure measurements may be used to construct formation pressure gradients that are displayed to personnel along with an assessment of the level of uncertainty. Stopping criteria are defined based on the level of uncertainty and/or the differential information gain. The benefits of the examples described herein provide for an expedited way to discover system information or knowledge which may additionally include the benefit of obtaining better system information or knowledge. The examples further provide a method by which to terminate the additional testing to discover system information or knowledge. This leads to more economic testing, more effective testing, and the benefits of oil exploration and production gained by a better understanding of the asset including completions, production and other operational design and decisions.

Accordingly, this disclosure describes systems and methods which may relate to subterranean operations. The systems and methods may further be characterized by one of more of the following statements:

Statement 1. A method may comprise disposing a downhole pressure sampling tool into a wellbore, calculating a prior distribution based at least in part on one or more proxy logs, moving the downhole pressure sampling tool to a first location in the wellbore, taking at least one measurement with the downhole pressure sampling tool at the first location in the wellbore, calculating a posterior distribution based at least in part on the at least one measurement and the prior distribution, identifying a second location based at least in part on the posterior distribution, and moving the downhole pressure sampling tool to the second location.

Statement 2. The method of statement 1, wherein the first location is selected based at least in part on the one or more proxy logs.

Statement 3. The method of statements 1 or 2, wherein the measurement is a pressure measurement or a pressure gradient measurement.

Statement 4. The method of any of the preceding statements, wherein the one or more proxy logs comprises at least one proxy log selected from the group consisting of gamma ray, density porosity, neutron porosity, resistivity, NMR, sonic, ultrasonic, borehole images, optical, mud logs, and combinations thereof.

Statement 5. The method of any of the preceding statements, wherein identifying the second location based at least in part on the posterior distribution further comprises maximizing an information gain.

Statement 6. The method of any of the preceding statements, further comprising applying Bayes' Theorem to calculate the posterior distribution from at least the prior distribution.

Statement 7. The method of any of the preceding statements, wherein identifying the second location based at least in part on the posterior distribution further comprises identifying a location from the posterior distribution associated with a highest variance.

Statement 8. The method of any of the preceding statements, wherein identifying the second location based at least in part on the posterior distribution further comprises maximizing a projection of a first principal component.

Statement 9. The method of any of the preceding statements, wherein identifying the second location based at least in part on the posterior distribution further comprises minimizing a differential entropy Statement 10. The method of any of the preceding statements, wherein calculating the posterior distribution further comprises calculating an uncertainty.

Statement 11. The method of any of the preceding statements, further comprising taking a measurement with the downhole pressure sampling tool at the second location in the wellbore.

Statement 12. The method of any of the preceding statements, further comprising determining if a termination criterion is met.

Statement 13. The method of any of the preceding statements, further comprising applying an unsupervised machine learning algorithm to the at least one measurement to identify a fluid contact depth or a formation compartment.

Statement 14. The method of any of the preceding statements, further comprising applying a regression to the at least one measurement to determine a pressure gradient.

Statement 15. A system may comprise a downhole sampling tool comprising at least one sensor to take at least one measurement and an information handling system. The information handling system may be configured to calculate a prior distribution based at least in part on the one or more proxy logs, calculate a posterior distribution based at least in part on the at least one measurement and the prior distribution, and identify one or more sampling locations based at least in part on the posterior distribution.

Statement 16. The system of statement 15, wherein the information handling system is further configured to calculate the posterior distribution by applying Bayes' Theorem to the prior distribution.

Statement 17. The system of statement 15 or 16, wherein the at least one sensor further comprises at least one sensor selected from the group consisting of an optical fluid sensor, a non-optical fluid sensor, a pressure transducer, and combinations thereof.

Statement 18. The system of any of the preceding statements 15-17, wherein the at least one measurement is a pressure measurement.

Statement 19. The system of any of the preceding statements 15-18, wherein the information handling system is further configured to minimize a differential entropy.

Statement 20. The system of any of the preceding statements 15-19, wherein the information handling system is further configured to identify a fluid contact depth or a formation compartment by applying an unsupervised machine learning algorithm to the at least one measurement.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising." "containing." or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b." or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    calculating a prior distribution of formation pressure gradients based at least in part on one or more proxy logs, wherein proxy logs comprise previously acquired logs on at least one well in a neighboring vicinity of a well of interest and/or the well of interest;
    selecting a first location in a wellbore of the well of interest for a formation pressure measurement from the prior distribution;
    disposing a downhole pressure sampling tool into the wellbore;
    moving the downhole pressure sampling tool to the first location in the wellbore;
    taking at least one measurement with the downhole pressure sampling tool at the first location in the wellbore;
    calculating a posterior distribution based at least in part on the at least one measurement and the prior distribution;
    identifying a second location based at least in part on the posterior distribution and a ranking of candidate formation pressure measure locations according to an expected information gain from each of the candidate formation pressure measurement locations;
    moving the downhole pressure sampling tool to the second location; and
    identifying a termination threshold based at least in part on a differential information gain.

2. The method of claim 1, wherein the first location is selected based at least in part on the one or more proxy logs.

3. The method of claim 1, wherein the at least one measurement is a pressure measurement or a pressure gradient measurement.

4. The method of claim 1, wherein the one or more proxy logs comprises at least one proxy log selected from the group consisting of gamma ray, density porosity, neutron porosity, resistivity, NMR, sonic, ultrasonic, borehole images, optical, mud logs, and combinations thereof.

5. The method of claim 1, wherein identifying the second location based at least in part on the posterior distribution further comprises maximizing a rate of information gain per formation pressure measurement location.

6. The method of claim 1, further comprising applying Bayes' Theorem to calculate the posterior distribution from at least the prior distribution.

7. The method of claim 1, wherein identifying the second location based at least in part on the posterior distribution further comprises identifying a location from the posterior distribution associated with a highest variance.

8. The method of claim 1, wherein identifying the second location based at least in part on the posterior distribution further comprises maximizing a projection of a first principal component.

9. The method of claim 1, wherein identifying the second location is based at least in part on the posterior distribution further comprises minimizing a differential entropy.

10. The method of claim 1, wherein calculating the posterior distribution further comprises calculating an uncertainty.

11. The method of claim 1, further comprising taking a measurement with the downhole pressure sampling tool at the second location in the wellbore.

12. The method of claim 1, further comprising determining if a termination criterion is met.

13. The method of claim 1, further comprising applying an unsupervised machine learning algorithm to the at least one measurement to identify a fluid contact depth or a formation compartment.

14. The method of claim 1, further comprising applying a regression to the at least one measurement to determine a pressure gradient.

15. A system comprising:
    a downhole sampling tool comprising at least one sensor to take at least one measurement; and
    an information handling system configured to:
        calculate a prior distribution based at least in part on one or more proxy logs;
        calculate a posterior distribution based at least in part on the at least one measurement taken by the at least one sensor of the downhole sampling tool and the prior distribution;
        identify one or more sampling locations based at least in part on the posterior distribution and a ranking of candidate formation pressure m asurement locations according to an expected information gain from each of the candidate formation p ssure measurement locations;
        send instructions to the downhole sampling tool to move to the one or more identified sampling locations; and
        identify a termination threshold based at least in part on a differential information gain.

16. The system of claim 15, wherein the information handling system is further configured to calculate the posterior distribution by applying Bayes' Theorem to the prior distribution.

17. The system of claim 15, wherein the at least one sensor further comprises at least one sensor selected from the group consisting of an optical fluid sensor, a non-optical fluid sensor, a pressure transducer, and combinations thereof.

18. The system of claim 15, wherein the at least one measurement is a pressure measurement.

19. The system of claim 15, wherein the information handling system is further configured to minimize a differential entropy.

20. The system of claim 15, wherein the information handling system is further configured to identify a fluid contact depth or a formation compartment by applying an unsupervised machine learning algorithm to the at least one measurement.

* * * * *